United States Patent
Jung et al.

(10) Patent No.: US 12,190,132 B2
(45) Date of Patent: Jan. 7, 2025

(54) ELECTRONIC DEVICE FOR DISPLAYING PLURALITY OF APPLICATION EXECUTION SCREENS, AND METHOD RELATED THERETO

(71) Applicant: SAMSUNG ELECTRONICS CO., LTD., Suwon-si (KR)

(72) Inventors: Jinyung Jung, Suwon-si (KR); Jihun Lee, Suwon-si (KR); Jaemin Jung, Suwon-si (KR); Younghak Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/116,654

(22) Filed: Mar. 2, 2023

(65) Prior Publication Data

US 2023/0205555 A1    Jun. 29, 2023

Related U.S. Application Data

(63) Continuation of application No. PCT/KR2021/011517, filed on Aug. 27, 2021.

(30) Foreign Application Priority Data

Sep. 2, 2020  (KR) .................. 10-2020-0111439

(51) Int. Cl.
*G06F 9/451* (2018.01)
*G06F 1/16* (2006.01)
*G06F 3/0482* (2013.01)

(52) U.S. Cl.
CPC ............ *G06F 9/451* (2018.02); *G06F 1/1677* (2013.01); *G06F 3/0482* (2013.01)

(58) Field of Classification Search
CPC ...... G06F 9/451; G06F 1/1677; G06F 3/0482; G06F 1/16; G06F 3/01; G06F 3/14;
(Continued)

(56) References Cited

U.S. PATENT DOCUMENTS

| 9,547,683 B2 | 1/2017 | Peters et al. |
| 9,575,776 B2 | 2/2017 | De Andrade Cajahyba et al. |

(Continued)

FOREIGN PATENT DOCUMENTS

| CN | 110225154 A | 9/2019 |
| KR | 10-2014-0034578 A | 3/2014 |

(Continued)

OTHER PUBLICATIONS

International Search Report (PCT/ISA/210) dated Dec. 17, 2021 issued by the International Searching Authority in International Application No. PCT/KR2021/011517.

(Continued)

*Primary Examiner* — Andrey Belousov
(74) *Attorney, Agent, or Firm* — Sughrue Mion, PLLC

(57) ABSTRACT

An electronic device includes: a foldable display; a processor operationally coupled with the display; and a memory operationally coupled with the processor, wherein the memory stores instructions that, when executed, cause the processor to: detect a screen layout state of the foldable display based on at least one of a folding angle of the foldable display, a rotation angle of the foldable display, a mounting state of the electronic device, or a gripped state of the electronic device; determine a plurality of applications for execution, based on the detected screen layout state; determine a plurality of regions of the foldable display on which the plurality of applications are to be displayed, based (Continued)

on the detected screen layout state; and display execution screens of the plurality of applications on the plurality of regions.

16 Claims, 25 Drawing Sheets

(58) Field of Classification Search
CPC ...... G06F 18/00; G06F 3/1431; G06F 1/1616; G06F 1/1686; G06F 3/011; G06F 2203/04803; H04M 1/02; H04M 1/72469; H04M 1/0216; G06V 40/16
See application file for complete search history.

(56) References Cited

U.S. PATENT DOCUMENTS

| | | | |
|---|---|---|---|
| 10,209,878 | B2 | 2/2019 | Sang et al. |
| 10,705,716 | B2 | 7/2020 | Sang et al. |
| 10,754,604 | B2 | 8/2020 | Lee et al. |
| 11,036,257 | B2 | 6/2021 | Kim et al. |
| 11,048,681 | B2 | 6/2021 | Peters et al. |
| 11,227,035 | B2 | 1/2022 | Keen et al. |
| 11,262,800 | B2 | 3/2022 | Kim et al. |
| 2014/0068504 | A1* | 3/2014 | Sun .................. G06F 3/0481 715/788 |
| 2015/0106737 | A1* | 4/2015 | Montoy-Wilson ...... G06F 9/451 715/745 |
| 2015/0227224 | A1* | 8/2015 | Park .................. G06F 3/0488 345/173 |
| 2015/0033888 | A1 | 11/2015 | Kim et al. |
| 2018/0188910 | A1* | 7/2018 | Ko .................. G06F 3/0482 |
| 2019/0266738 | A1 | 8/2019 | Kim et al. |
| 2021/0390087 | A1 | 12/2021 | Peters et al. |
| 2023/0247120 | A1* | 8/2023 | Kwon .................. H04M 1/04 455/575.3 |

FOREIGN PATENT DOCUMENTS

| | | |
|---|---|---|
| KR | 10-2014-0124274 A | 10/2014 |
| KR | 10-1614035 B1 | 4/2016 |
| KR | 10-2016-0108705 A | 9/2016 |
| KR | 10-2018-0020669 A | 2/2018 |
| KR | 10-2019-0031870 A | 3/2019 |
| KR | 10-2019-0102479 A | 9/2019 |
| KR | 10-2019-0124189 A | 11/2019 |
| KR | 10-2020-0014878 A | 2/2020 |
| KR | 10-2085473 B1 | 3/2020 |
| WO | 2016/035907 A1 | 3/2016 |

OTHER PUBLICATIONS

Written Opinion (PCT/ISA/237) dated Dec. 17, 2021 issued by the International Searching Authority in International Application No. PCT/KR2021/011517.

* cited by examiner

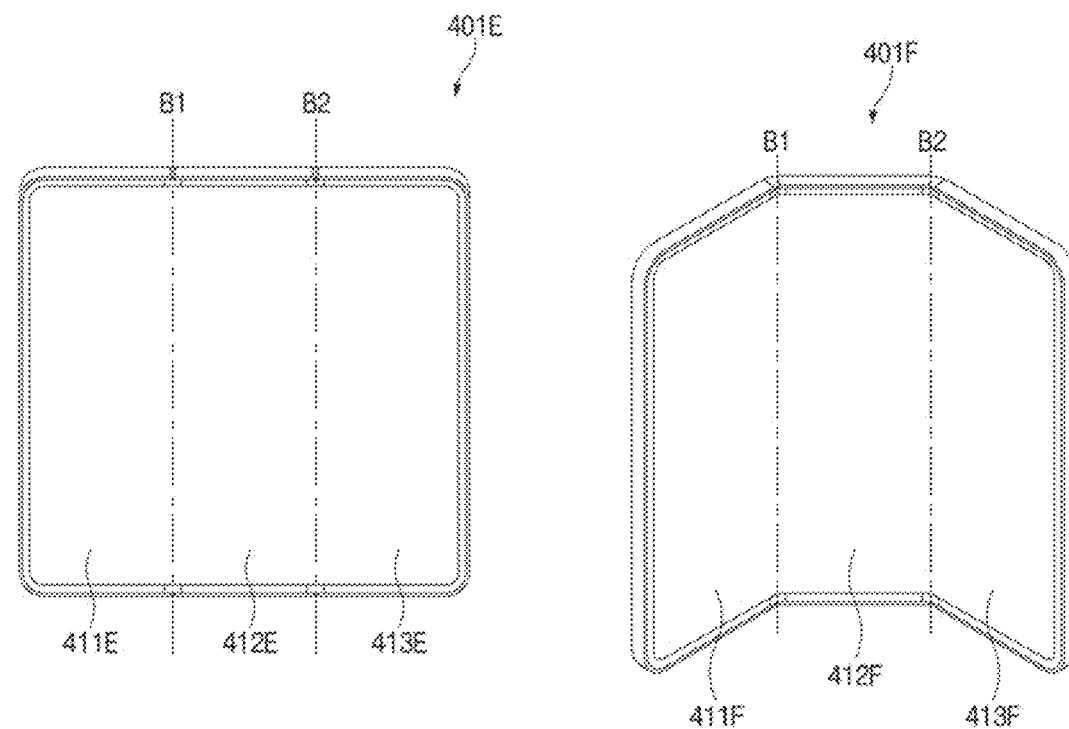
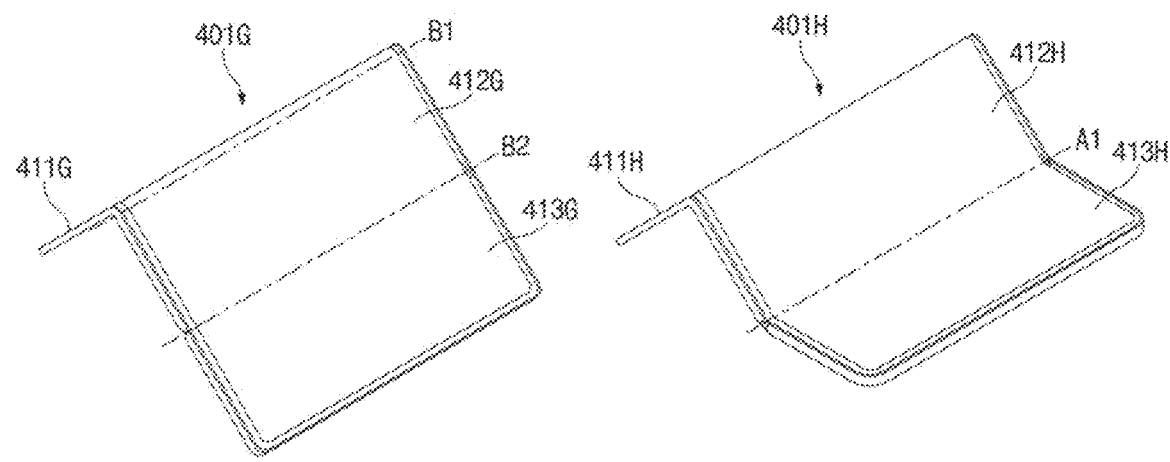
FIG.4B

| Screen layout state | Context | App group 1 | App group 2 | App group 3 |
|---|---|---|---|---|
| 801 — (layout 1,2,3) | • S Pen activated<br>• Mirrored monitor<br>• Location: Office | [Presenter mode]<br>1. Slide show<br>2. Presenter mode<br>3. Memo | [Interview mode]<br>1. Document viewer<br>2. Movie record<br>3. Text dictation | [Messenger mode]<br>1. None<br>2. Messenger<br>3. Keyboard |
| 802 — (layout 1,2,3) | • Home<br>• BT speaker connected<br>• Dark environment | [Juke box mode]<br>1. Mood lighting<br>2. Mood light settings<br>3. Music player | [Karaoke mode]<br>1. Mood lighting<br>2. Karaoke<br>3. Audio record | [Reading mode]<br>1. None<br>2. eBook<br>3. Music player |
| 803 — (layout 1,2) | • Home<br>• Time to sleep (by health data)<br>• DND activated<br>• Recent app: Reminder | [Alarm clock mode]<br>1. Alarm clock<br>2. Ambient light | [Radio mode]<br>1. Radio<br>2. Alarm | [Wrap up mode]<br>1. Reminder list<br>2. Alarm |

FIG. 8A

| Screen layout state | Context | App group 1 | App group 2 | App group 3 |
|---|---|---|---|---|
| 80A | • S Pen activated<br>• Mirrored monitor<br>• Location: Office | [Presenter mode]<br>1. Slide show<br>2. Presenter mode<br>3. Memo | [Interview mode]<br>1. Document viewer<br>2. Movie record<br>3. Text dictation | [Messenger mode]<br>1. None<br>2. Messenger<br>3. Keyboard |
| 80B | • BT ear set connected<br>• S Pen activated<br>• Music app playing | [Drawing mode]<br>1. Music<br>2. Drawing | [Instrument mode]<br>1. Music sheet<br>2. Piano | [Messenger mode]<br>1. Messenger<br>2. Keyboard |
| 80C | • Ongoing app: Youtube<br>• BT ear set connected<br>• Recent app1: E-book<br>• Recent app2: Browser<br>• Location: café | [Duo mode1]<br>1. Youtube<br>2. E-book | [Duo mode2]<br>1. Youtube<br>2. Browser | [Reading mode]<br>1. None<br>2. E-book |

FIG. 8B

| Screen layout state | Context | App group 1 | App group 2 | App group 3 |
|---|---|---|---|---|
| 807 — (layout with 1, 2) | • S Pen activated<br>• Mirrored monitor<br>• Location: Office | [Duo browser mode]<br>1. Browser A<br>2. Browser B | [Study mode]<br>1. Document viewer<br>2. Note | [Mail mode]<br>1. Email<br>2. Note |
| 808 — (layout with 1, 2, 3) | • Woke up in the morning<br>• S Pen activated<br>• Scheduled task<br>• BT speaker connected | [Daily briefing mode]<br>1. Calendar<br>2. Weather<br>3. E-mail | [Planner mode]<br>1. News<br>2. Today's schedule<br>3. World clock | [Ideation mode]<br>1. Image board<br>2. Music<br>3. Note |

FIG. 8C

ELECTRONIC DEVICE FOR DISPLAYING PLURALITY OF APPLICATION EXECUTION SCREENS, AND METHOD RELATED THERETO

CROSS-REFERENCE TO RELATED APPLICATIONS

This application is a bypass continuation of International Application No. PCT/KR2021/011517, filed on Aug. 27, 2021, which is based on and claims priority to Korean Patent Application No. 10-2020-0111439, filed on Sep. 2, 2020, the disclosures of which are incorporated by reference herein in their entireties.

BACKGROUND

1. Field

The disclosure relates to a technology for displaying a plurality of application execution screens.

2. Description of Related Art

With the development of software technology, portable electronic devices, such as smart phones or tablet computers, provide various functions to users through applications. For example, a user of an electronic device may receive various types of information through a web browser, may interact with acquaintances through a messenger application, or may experience audiovisual contents through a media application. In addition, the user of the electronic device may experience extended functions by using an external device, such as earphones, a stylus pen, or a wearable device, and an application corresponding to the external device.

Due to the development of display technology, a portable electronic device having a variable display screen is being introduced. For example, the size of a display of the electronic device may be changed through folding, sliding, or rolling.

Before extension of the display, a single application execution screen has to be displayed on the display due to its limited size. However, due to extension of the display, it may be useful to simultaneously display a plurality of application execution screens. In addition, a screen layout on which an application execution screen is output is able to be changed in various shapes due to a folding angle or rotation angle of the display, and accordingly there is a need for recommending an appropriate application to a user depending on the screen layout.

SUMMARY

Provided is an electronic device that may provide an appropriate application group to a user depending on a screen layout state.

In addition, provided is an electronic device that may provide a plurality of application execution screens to a user in an appropriate form depending on a screen layout state.

In addition, provided is an electronic device that may recommend an appropriate application group to a user, further based on context information of the electronic device as well as a screen layout state.

In addition, provided is an electronic device that may simultaneously display a plurality of application execution screens on a plurality of display regions even without a user's touch input.

Additional aspects will be set forth in part in the description which follows and, in part, will be apparent from the description, or may be learned by practice of the presented embodiments.

According to an aspect of the disclosure, an electronic device may include: a foldable display; a processor operationally coupled with the display; and a memory operationally coupled with the processor, wherein the memory stores instructions that, when executed, cause the processor to: detect a screen layout state of the foldable display based on at least one of a folding angle of the foldable display, a rotation angle of the foldable display, a mounting state of the electronic device, or a gripped state of the electronic device; determine a plurality of applications for execution, based on the detected screen layout state; determine a plurality of regions of the foldable display on which the plurality of applications are to be displayed, based on the detected screen layout state; and display execution screens of the plurality of applications on the plurality of regions.

The instructions cause the processor to detect the screen layout state based on at least one of a folding angle, a rotation angle, a mounting state, or a gripped state of the foldable display.

The instructions cause the processor to: obtain context information of the electronic device; and determine the plurality of applications for execution based on the detected screen layout state and the obtained context information.

The context information may include at least one of a connection state between the electronic device and an external electronic device, a device type of the external electronic device, external environmental information of the electronic device, an ongoing application in the electronic device, location information or time information of the electronic device, or health data corresponding to a user account of the electronic device.

The electronic device may further include: a first camera disposed to face a same direction as a first region of the foldable display; and a second camera disposed to face a same direction as a second region of the foldable display, and the instructions cause the processor to execute the instructions to: recognize a plurality of user faces through the first camera and the second camera; and determine the plurality of applications for execution, further based on the recognition of the plurality of user faces.

The instructions cause the processor to: determine whether an event related to the display of the execution screens of the plurality of applications is detected, based on the detected screen layout state; display the execution screens of the plurality of applications on the plurality of regions based on the event being detected; and maintain an existing screen based on the event being not detected.

The instructions cause the processor to: based on receiving a first user input to call the GUI representing an application group list and the event being not detected, display a graphic user interface (GUI) through the foldable display; and based on receiving a second user input to select an application group from the application group list, display execution screens of a plurality of applications corresponding to the application group on the plurality of regions.

The instructions cause the processor to: based on receiving a third user input to generate a new application group, display a screen of a first region, among the plurality of regions, and apply dimming to a second region other than the first region, among the plurality of regions; based on receiving a fourth user input to select one of a plurality of applications included in the first region, display a screen of the second region and apply dimming to the first region; and based on receiving a fifth user input to select one of a plurality of applications included in the second region, display an execution screen of an application selected by the fourth user input on the first region and display an execution screen of an application selected by the fifth user input on the second region.

The instructions cause the processor to group the application selected by the fourth user input and the application selected by the fifth user input together as a new application group corresponding to the detected screen layout state.

The instructions cause the processor to, based on receiving a sixth user input to divide the screen of the first region while the screen of the first region is displayed and dimming is applied to the screen of the second region, divide the first region into a first sub-region and a second sub-region.

According to an aspect of the disclosure, a method of an electronic device, includes: detecting a screen layout state of a foldable display of the electronic device based on at least one of a folding angle of the foldable display, a rotation angle of the foldable display, a mounting state of the electronic device, or a gripped state of the electronic device; determining a plurality of applications for execution, based on the detected screen layout state; determining a plurality of regions of the foldable display on which the plurality of applications are to be displayed, based on the detected screen layout state; and displaying execution screens of the plurality of applications on the plurality of regions.

The detecting the screen layout state may include at least one of: detecting a folding angle of the foldable display; detecting a rotation angle of the foldable display; detecting a mounting state of the electronic device; or detecting a gripped state of the electronic device.

The method may further include obtaining context information of the electronic device, and the determining the plurality of applications for execution may include determining the plurality of applications for execution based on the screen layout state and the context information.

The context information may include at least one of a connection state between the electronic device and an external electronic device, a device type of the external electronic device, external environmental information of the electronic device, an ongoing application in the electronic device, location information or time information of the electronic device, or health data corresponding to a user account of the electronic device.

The method may further include: recognizing a plurality of user faces using a plurality of cameras of the electronic device, and the determining of the plurality of applications for the execution may include determining the plurality of applications for execution based on the screen layout state and the recognition of the plurality of user faces.

The method may further include determining whether an event related to the display of the execution screens of the plurality of applications is detected, based on the detected screen layout state, and the displaying the execution screens of the plurality of applications on the plurality of regions may include, based on the event being detected, displaying the execution screens of the plurality of applications on the plurality of regions.

The method may further include, based on a first user input to call the GUI representing an application group list and the event being not detected, displaying a graphic user interface (GUI) through the foldable display, and the displaying the execution screens of the plurality of applications on the plurality of regions may include, based on receiving a second user input to select an application group from the application group list, displaying execution screens of a plurality of applications corresponding to the application group on the plurality of regions.

The method may further include: based on receiving a third user input to create a new application group, displaying a screen of a first region among the plurality of regions and applying dimming to a second region other than the first region among the plurality of regions; based on receiving a fourth user input to select one of a plurality of applications included in the first region, displaying a screen of the second region and applying dimming to the first region; and based on receiving a fifth user input to select one of a plurality of applications included in the second region, displaying an execution screen of an application selected by the fourth user input on the first region and displaying an execution screen of an application selected by the fifth user input on the second region.

The method may further include grouping the application selected by the fourth user input and the application selected by the fifth user input together as a new application group corresponding to the detected screen layout state.

The method may further include, based on receiving a sixth user input to divide the screen of the first region while the screen of the first region is displayed and dimming is applied to the screen of the second region, dividing the first region into a first sub-region and a second sub-region.

According to an aspect of the disclosure, a non-transitory computer readable medium storing one or more instructions executable by a processor of an electronic device, wherein the instructions cause the processor to: detect a screen layout state of a foldable display of the electronic device based on at least one of a folding angle of the foldable display, a rotation angle of the foldable display, a mounting state of the electronic device, or a gripped state of the electronic device; determine a plurality of applications for execution, based on the detected screen layout state; determine a plurality of regions of the foldable display on which the plurality of applications are to be displayed, based on the detected screen layout state; and display execution screens of the plurality of applications on the plurality of regions.

The instructions cause the processor to: obtain context information of the electronic device; and determine the plurality of applications for execution based on the detected screen layout state and the obtained context information.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4B illustrates a screen layout state depending on a folding angle and a rotation angle of a display, according to an embodiment;

FIG. 8A illustrates a database including application groups depending on a screen layout state and context information, according to an embodiment;

FIG. 8B illustrates a database including application groups depending on a screen layout state and context information, according to an embodiment;

FIG. 8C illustrates a database including application groups depending on a screen layout state and context information, according to an embodiment;

DETAILED DESCRIPTION

Hereinafter, various embodiments of the disclosure will be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
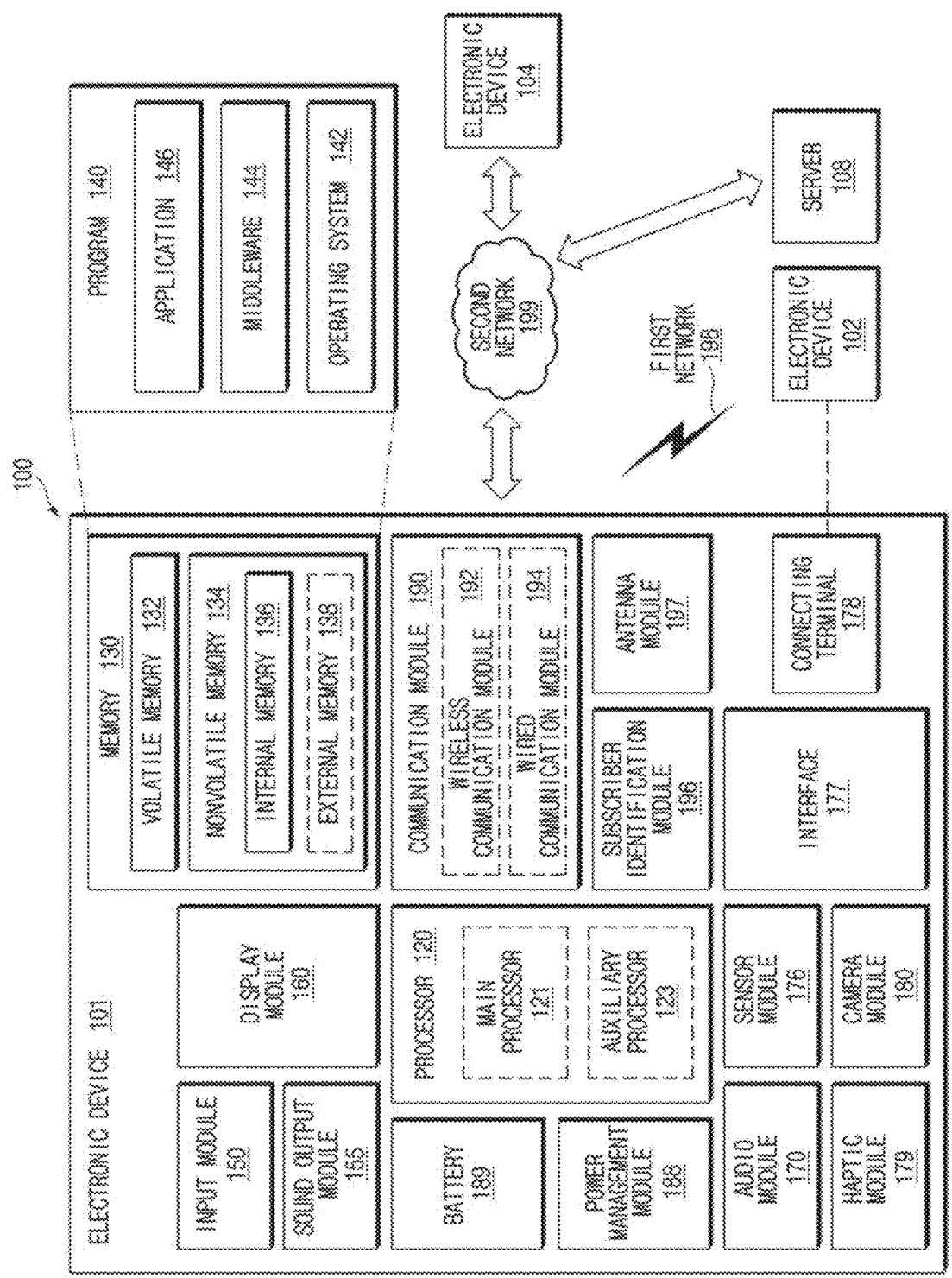
FIG. 1 is a block diagram of an electronic device in a network environment, according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
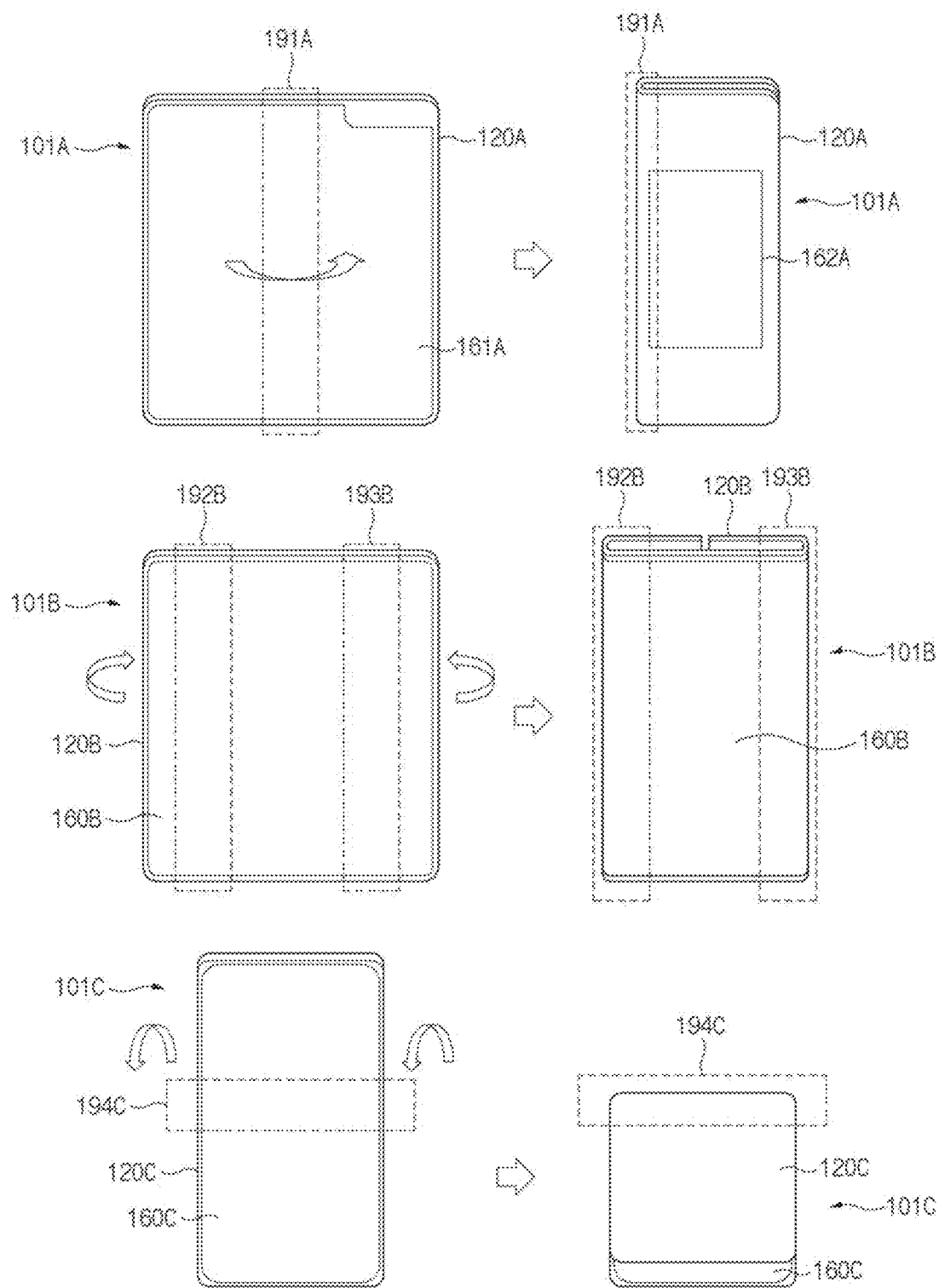
FIG. 2 illustrates electronic devices that change in shape, according to an embodiment.

FIG. 2 illustrates electronic devices that change in shape according to an embodiment.

According to an embodiment, the shape of the electronic device 101A, 101B, or 101C (e.g., the electronic device 101 of FIG. 1) may be physically changed depending on folding and/or unfolding. For example, the electronic device 101A, 101B, or 101C may include a flexible display on at least a portion thereof. The electronic device may be folded (e.g., closed) or unfolded (e.g., opened) about a folding portion of the electronic device. For example, the folding portion of the electronic device may be referred to as a hinge portion. The folding portion refers to a portion (e.g., a hinge) or region in which the shape of the electronic device can be changed and is not limited to a specific structure.

According to an embodiment, the electronic device 101A (e.g., the electronic device 101 of FIG. 1) may be folded leftward and rightward. In FIG. 2, the left direction may be referred to as the −X-axis direction, and the right direction may be referred to as the +X-axis direction. For example, the electronic device 101A may be folded about at least one folding portion 191A. For example, the electronic device 101A may include a first display 161A that is flexible (e.g., the display module 160 of FIG. 1). The electronic device 101A may be folded or unfolded about the folding portion 191A. The electronic device 101A may include a second display 162A (e.g., the display module 160 of FIG. 1) disposed on another surface facing away from one surface on which the first display 161A is disposed. Although FIG. 2 illustrates one example that the second display 162A occupies a portion of one side of a housing 120A, a second display 162A according to another embodiment may occupy the entire one side of the housing 120A.

In FIG. 2, the electronic device 101A is illustrated as an in-fold electronic device in which the first display 161A is folded inward. However, embodiments of the disclosure are not limited thereto. For example, the electronic device 101A may be an out-fold electronic device in which the first display 161A is folded outward, or may be an electronic device that supports both in-fold and out-fold. In another example, although the first display 161A is illustrated as a single display, embodiments of the disclosure are not limited thereto. The electronic device 101A may include a plurality of displays divided with respect to the folding portion 191A. The housing 120A may include a plurality of housings (e.g., a first housing 220 and a second housing 230 of FIG. 2) divided with respect to the folding portion 191A. In another example, the electronic device 101A may be a combination of a plurality of electronic devices combined so as to be folded about the folding portion 191A. In this case, the plurality of electronic devices may be combined together by a separate structure (e.g., a housing or a hinge).

Figure 3:
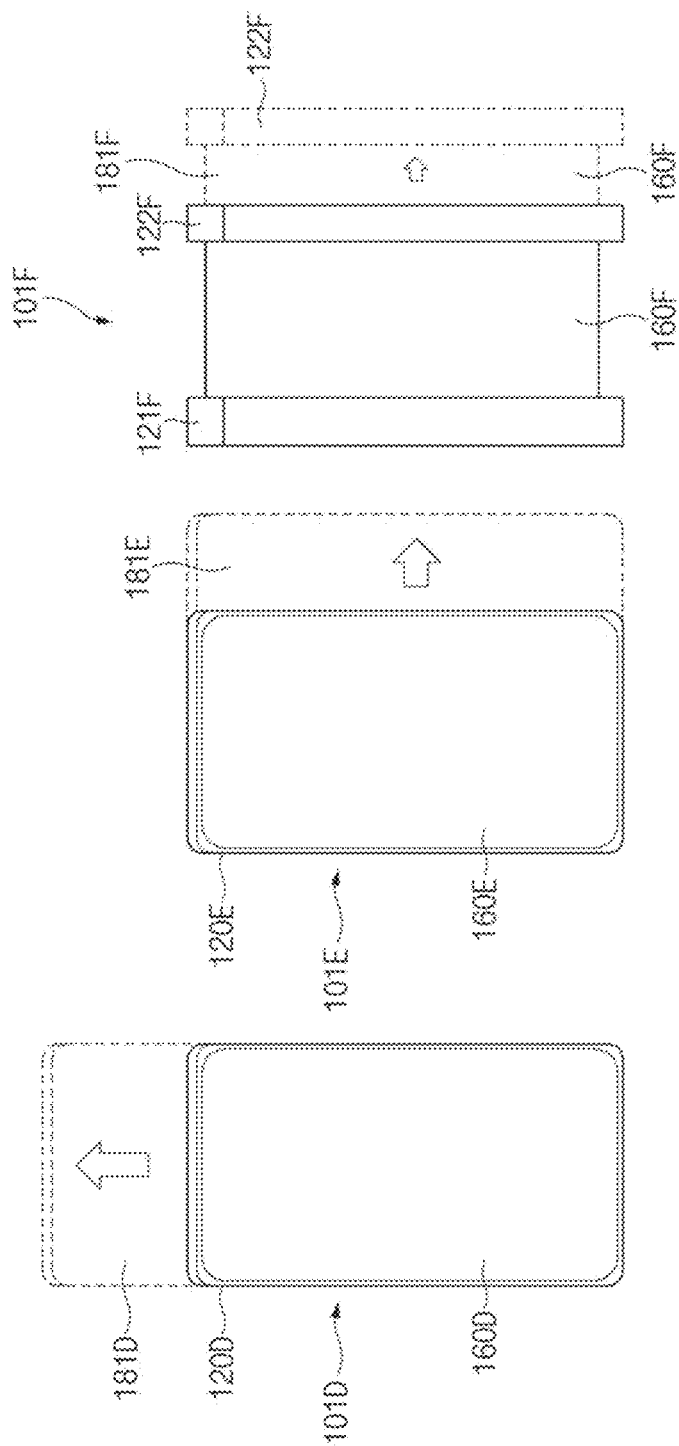
FIG. 3 illustrates electronic devices that change in shape, according to an embodiment.

According to an embodiment, the electronic device 101B (e.g., the electronic device 101 of FIG. 1) may be folded about a plurality of axes. For example, the electronic device 101B may include a flexible display 160B (e.g., the display module 160 of FIG. 1). For example, the electronic device 101B may be folded leftward and rightward about a second folding portion 192B and a third folding portion 193B. In FIG. 3, the electronic device 101B is illustrated as an out-fold electronic device in which the display 160B is folded outward. However, embodiments of the disclosure are not limited thereto. For example, the electronic device 101B may be in-folded about the second folding portion 192B and/or the third folding portion 193B. In another example, although the display 160B is illustrated as a single display, embodiments of the disclosure are not limited thereto. The electronic device 101B may include a plurality of displays divided along at least one of the second folding portion 192B or the third folding portion 193B. The housing 120B may include a plurality of housings divided along at least one of the second folding portion 192B or the third folding portion 193B. In another example, the electronic device 101B may be a combination of a plurality of electronic devices combined so as to be folded about the second folding portion 192B and the third folding portion 193B. In this case, for example, the plurality of electronic devices may be combined together by a separate structure (e.g., a housing or a hinge).

According to an embodiment, the electronic device 101C (e.g., the electronic device 101 of FIG. 1) may be folded upward and downward. In FIG. 2, the upper direction may be referred to as the +Y-axis direction, and the lower direction may be referred to as the −Y-axis direction. For example, the electronic device 101C may include a flexible display 160C (e.g., the display module 160 of FIG. 1). The electronic device 101C may be folded upward and downward about a fourth folding portion 194C. In FIG. 2, the electronic device 101C is illustrated as an in-fold electronic device in which the display 160C is folded inward. However, embodiments of the disclosure are not limited thereto. For example, the electronic device 101C may be out-folded, or in-folded and out-folded, about the fourth folding portion 194C. In another example, although the display 160C is illustrated as a single display, embodiments of the disclosure are not limited thereto. The electronic device 101C may include a plurality of displays divided along the fourth folding portion 194C. A housing 120C may include a plurality of housings divided along the folding portion 194C. In another example, the electronic device 101C may be a combination of a plurality of electronic devices combined so as to be folded about the fourth folding portion 194C. In this case, the plurality of electronic devices may be combined together by a separate structure (e.g., a housing or a hinge).

The changes in the physical shapes of the electronic devices (e.g., 101A, 101B, and 101C) illustrated in FIG. 2 are illustrative, and embodiments of the disclosure are not limited thereto. For example, the electronic devices may be folded or unfolded about any axis.

FIG. 3 illustrates electronic devices that change in shape according to an embodiment.

According to an embodiment, the shape of the electronic device 101D, 101E, or 101F (e.g., the electronic device 101 of FIG. 1) may be physically changed depending on extension and/or retraction of the housing of the electronic device. For example, the electronic device may include a housing and/or a display (e.g., the display module 160 of FIG. 1), at least a portion of which can be extended. For example, a portion of the electronic device may be slid or rolled such that the electronic device is extended (e.g., opened) or retracted (e.g., closed). An extension refers to a portion or region that corresponds to a difference between a first shape and a second shape when the shape of the electronic device is changed from the first shape to the second shape and is not limited to a specific structure.

According to an embodiment, the electronic device 101D (e.g., the electronic device 101 of FIG. 1) may include an extension 181D that is extended and/or retracted upward and downward. For example, at least a portion of a housing 120D of the electronic device 101D may include the extension 181D that is extended upward from the electronic device 101D. For example, the extension 181D, which is one portion of the housing 120D, may move upward relative to another portion of the housing 120D to extend the housing 120D of the electronic device 101D. The extension 181D may move independently of a display 160D (e.g., the display device 160 of FIG. 1). For example, the extension 181D may be moved upward relative to the display 160D. In another example, the extension 181D may be located downward relative to the display 160D. According to an embodiment, the extension 181D may include a camera module. For example, the camera module may be configured to rotate as the extension 181D moves.

According to an embodiment, the electronic device 101E (e.g., the electronic device 101 of FIG. 1) may include an extension 181E that is extended and/or retracted leftward and rightward. For example, at least a portion of a housing 120E of the electronic device 101E may include the extension 181E that is extended rightward from the electronic device 101E. For example, the extension 181E may move independently of a display 160E (e.g., the display device 160 of FIG. 1). In this case, a portion of the housing 120E may be moved to one side relative to the display 160E. In another example, the extension 181E may move together with the display 160E. In this case, the extension 181E may be moved to one side of the housing 120E together with the display 160E, and the display 160E may be extended accordingly. According to an embodiment, the extension 181E may include a camera module. For example, the camera module may be configured to rotate as the extension 181E moves.

According to an embodiment, the electronic device 101F (e.g., the electronic device 101 of FIG. 1) may include an extension 181F that is extended and/or retracted leftward and rightward. For example, a display 160F of the electronic device 101F (e.g., the display device 160 of FIG. 1) may be a rollable display. For example, at least a portion of the display 160F may be rolled and accommodated in a first housing 121F. For example, the display 160F may be unrolled and may be extended between the first housing 121F and a second housing 122F. The extension 181F may include a rolled portion of the display 160F.

The changes in the physical shapes of the electronic devices (e.g., 101D, 101E, and 101F) illustrated in FIG. 3 are illustrative, and embodiments of the disclosure are not limited thereto. For example, the electronic devices may be extended or retracted in any direction.

Figure 4A:
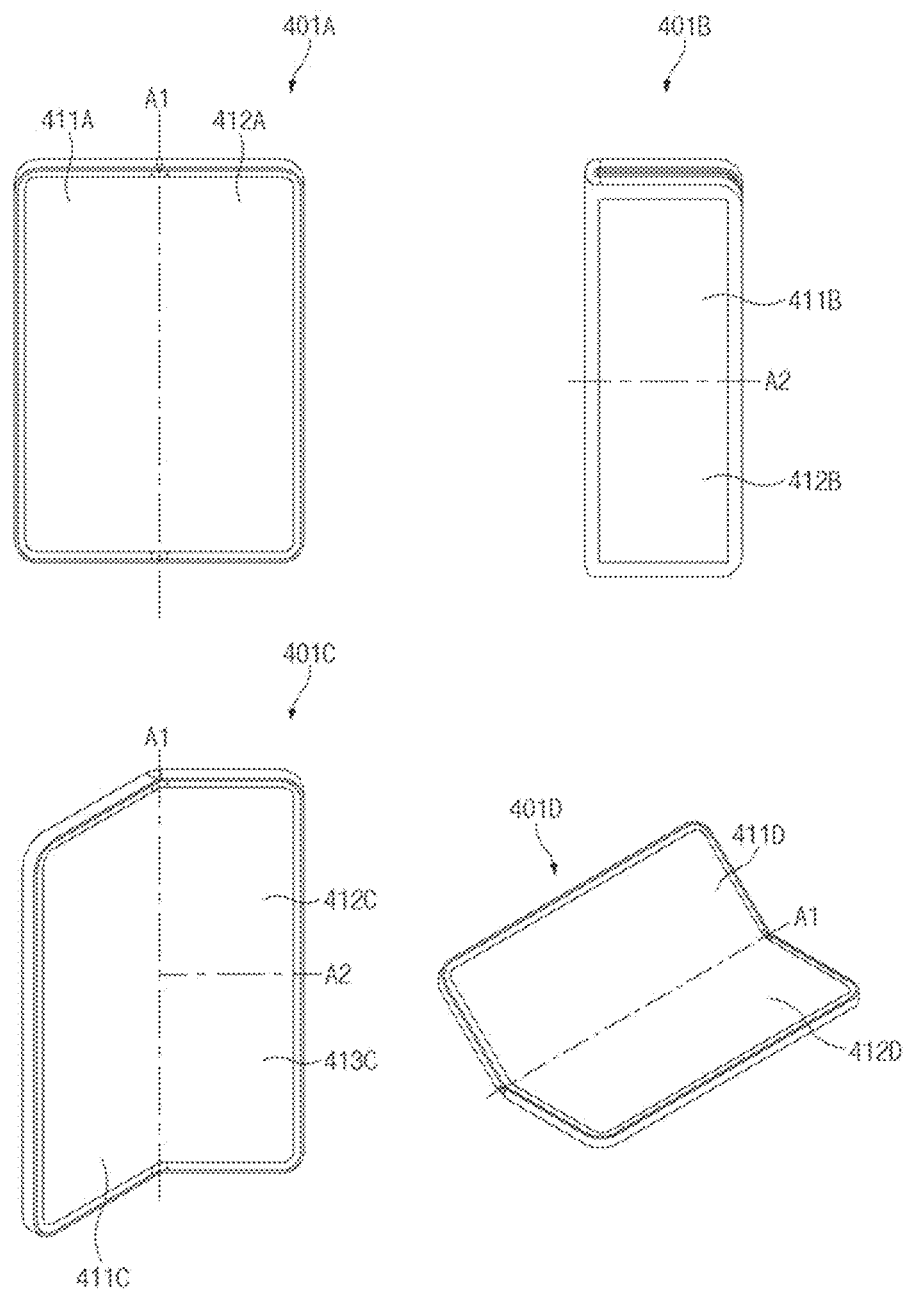
FIG. 4A illustrates a screen layout state depending on a folding angle and a rotation angle of a display, according to an embodiment.
Figure 4C:
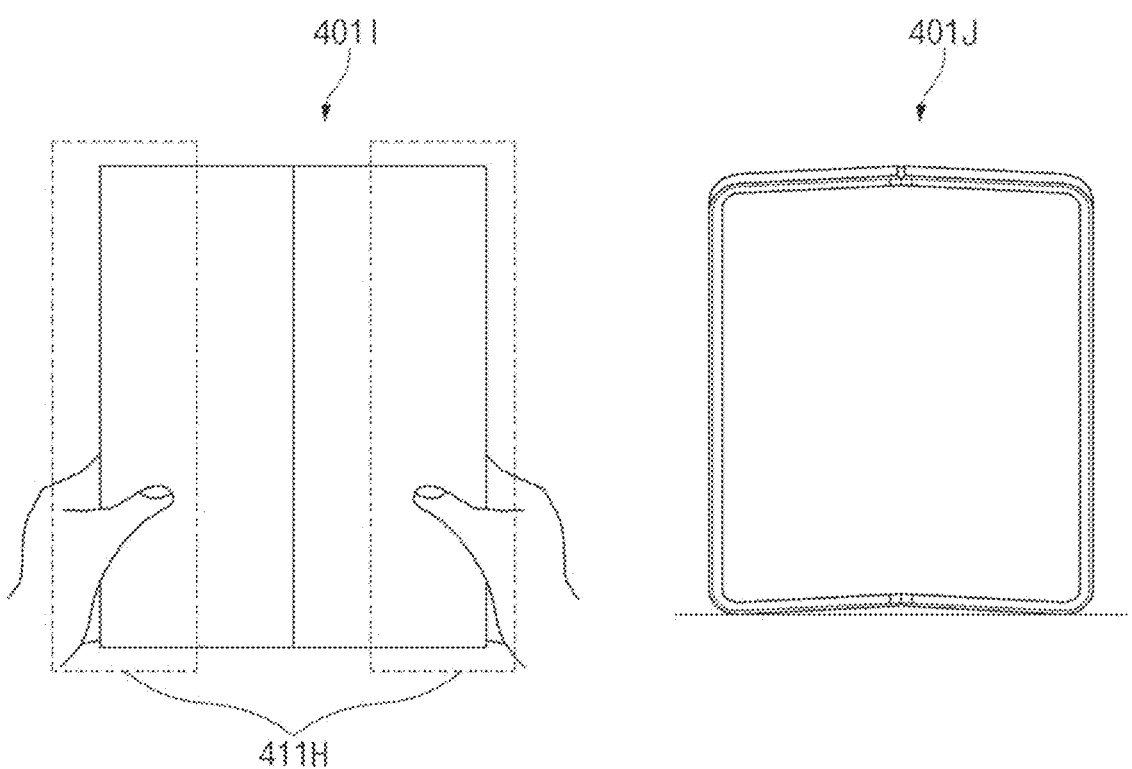
FIG. 4C illustrates a screen layout state depending on a gripped state, according to an embodiment.

FIGS. 4A to 4C illustrate screen layout states according to an embodiment. FIGS. 4A and 4B illustrate screen layout states depending on folding angles and rotation angles of displays. FIG. 4C illustrates a screen layout state depending on a gripped state. Electronic devices 401A, 401B, 401C, 401D, 401E, 401F, 401G, 401H, 401I, and 401J illustrated in FIGS. 4A to 4C may be the same as the electronic device 101 of FIG. 1, or may include similar components.

In the disclosure, a "screen layout state" may be used to determine a plurality of display regions on which a plurality of applications and a plurality of application execution screens are to be displayed. The screen layout state may be based on at least one of a folding angle, a rotation angle, a mounting state, or a gripped state of a display. Additionally, the screen layout state may be based on extension of the display depending on sliding or rolling. The folding, sliding, and rolling of the display may be based on the examples described with reference to FIGS. 2 and 3. The screen layout states illustrated in FIGS. 4A to 4C are merely illustrative, and various types of screen layout states may be applied according to a similar principle.

FIG. 4A illustrates a screen layout state of an electronic device in which a display is able to be folded about one axis A1.

Referring to FIG. 4A, the electronic device may split or divide the display into a plurality of regions based on a folding angle of the display. The folding angle may be detected based on a sensor (e.g., at least one of a Hall sensor, a terrestrial magnetism sensor, or a proximity sensor) included in the electronic device. For example, in response to detecting that the display is unfolded, the electronic device 401A may divide the display into a first region 411A and a second region 412A with respect to the axis A1 (e.g., the folding portion 191A of FIG. 2). In another example, in response to detecting that the display is fully folded (e.g., in-folded or out-folded), the electronic device 401B may divide the display into a first region 411B and a second region 412B with respect to another axis A2 perpendicular to the axis A1. In another example, in response to detecting that the display is partially folded (e.g., in-folded or out-folded), the electronic device 401C may divide the display into a first region 411C, a second region 412C, and a third region 413C with respect to the axis A1 and the other axis A2.

In another embodiment, the electronic device may differently divide the display based on a rotation angle of the display. The rotation angle may be detected based on at least one of an acceleration sensor or a gyro sensor included in the electronic device. For example, when the display is partially unfolded, the electronic device 401C may divide the display into the first region 411C, the second region 412C, and the third region 413C in response to detecting that the rotation angle of the display is vertically changed, and the electronic device 401D may divide the display into a first region 411D and a second region 412D in response to detecting that the rotation angle of the display is horizontally changed.

FIG. 4B illustrates a screen layout state of an electronic device in which a display is able to be folded about a plurality of axes (e.g., B1 and B2).

Referring to FIG. 4B, in response to detecting that the display is unfolded, the electronic device 401E may divide the display into a first region 411E, a second region 412E, and a third region 413E with respect to the axes B1 and B2 (e.g., the folding portions 192B and 193B of FIG. 2). Although not illustrated in FIG. 4B, in another embodiment, the electronic device 401E may divide the display into two regions like the electronic device 401A of FIG. 4A. In another example, in response to detecting that the display is partially folded (e.g., in-folded) about the axes B1 and B2, the electronic device 401F may divide the display into a first region 411F, a second region 412F, and a third region 413F with respect to the first axis B1 and the second axis B2. In another example, in response to detecting that the display is partially out-folded about the first axis B1 and unfolded about the second axis B2, the electronic device 401G may divide the display with respect to the first axis B1. In this case, the electronic device 401G may determine a first region 411G as one region and a second region 412G and a third region 413G as another region. In another example, in response to detecting that the display is partially out-folded about the first axis B1 and partially in-folded about the second axis B2, the electronic device 401H may divide the display into a first region 411H, a second region 412H, and a third region 413H with respect to the first axis B1 and the second axis B2.

FIG. 4C illustrates a screen layout state depending on a gripped state.

Referring to FIG. 4C, an electronic device may detect a gripped state of the electronic device. For example, the electronic device 401I may detect that the electronic device 401I is gripped, based on a sensor (e.g., a proximity sensor or a grip sensor) mounted on a portion (e.g., 411H) of a side surface of the electronic device 401I. In another embodiment, the electronic device 401I may detect that the electronic device 401I is gripped, based on a gyro sensor, an acceleration sensor, or another sensor capable of sensing movement of the electronic device 401I. In another example, the electronic device 401J may detect that the electronic device 401*j* is mounted without being gripped (or, the electronic device is placed on a table).

According to an embodiment, based on a detected screen layout state, an electronic device may determine a plurality of different applications that are to be executed in the electronic device. The plurality of applications determined based on the screen layout state may be referred to as an "application group". The electronic device may display execution screens of the plurality of determined applications on a plurality of divided regions. The electronic device may provide a multi-tasking environment suitable for a user by simultaneously outputting the application group corresponding to the screen layout state on the divided display regions. For example, the electronic device 401D of FIG. 4A may execute a document application on the first region 411D and may execute a virtual keyboard application on the second region 412D. In another example, when a plurality of users use the different regions 411G, 412G, and 413G of the display as in the electronic device 401G of FIG. 4B, the electronic device 401G may execute a video application on the first region 411G and may execute an e-book application on the second region 412G and the third region 413G. In another example, the electronic device 401H of FIG. 4B may execute a video application on the second region 412H and may execute a drawing application on the third region 413H. The electronic device 401H may not execute an application on the first region 411H and thus may reduce unnecessary power consumption. In another example, the electronic device 401J of FIG. 4C may execute a music application and a lighting application in response to detecting that the electronic device 401J is partially folded in a state in which a gripped state is not detected or movement of the electronic device 401J is not detected.

In an embodiment, the application group may be determined, further based on context information, usage history of an application, or a user's settings in addition to the screen layout state.

Figure 5:
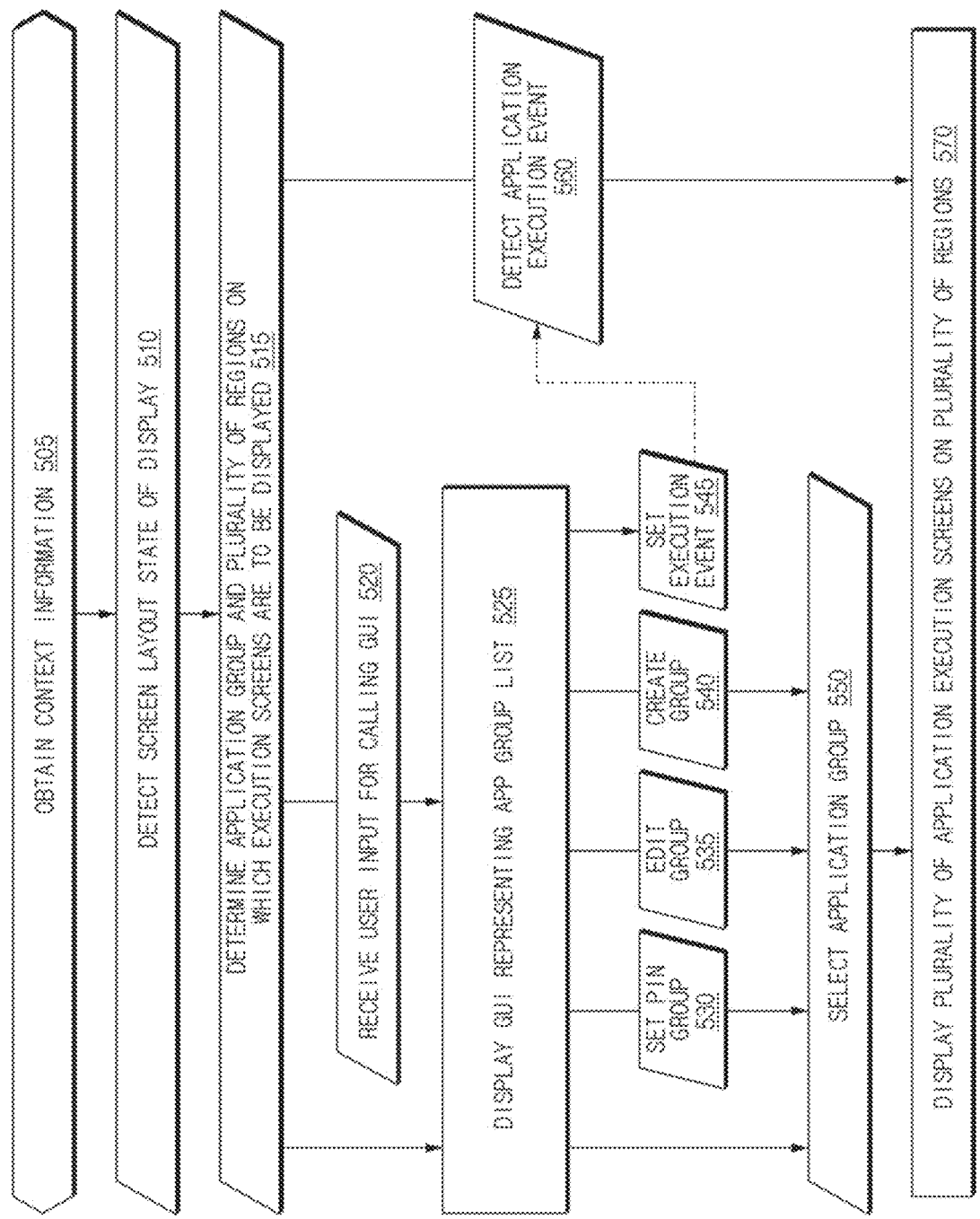
FIG. 5 illustrates an operating scenario of an electronic device for displaying a plurality of application execution screens, according to an embodiment.

FIG. 5 illustrates an operating scenario of an electronic device for displaying a plurality of application execution screens according to an embodiment. FIG. 5 illustrates an overall operating scenario of the electronic device, and at least some of the illustrated operations may be omitted.

Referring to FIG. 5, in operation 505, the electronic device (e.g., the electronic device 101 of FIG. 1) may obtain context information of the electronic device. The electronic device may obtain or monitor the context information every predetermined period.

In an embodiment, the context information may include a connection state between the electronic device and an external electronic device and a device type of the connected external electronic device. For example, the external electronic device may include a wearable device (e.g., wireless earphones, a smart watch, a head mounted device (HMD), augmented-reality (AR) glasses, or a speaker) or a vehicle that is connected with the electronic device through Wi-Fi or short-range wireless communication (e.g., Bluetooth). In another example, the external electronic device may include a stylus pen detachable from the electronic device. In another example, the external electronic device may include a home appliance (e.g., TV, a refrigerator, an electric fan, an air cleaner, a robot vacuum cleaner, or an air conditioner) connectable with the electronic device through Internet of things (IoT).

In an embodiment, the context information may include external environmental information of the electronic device. The external environmental information may include, for example, at least one of weather, temperature, humidity, fine dust, or precipitation. The electronic device may obtain the external environmental information using a sensor mounted therein, or may obtain the external environmental information from an external server through a wireless communication circuit (e.g., the wireless communication module 192 of FIG. 1).

In an embodiment, the context information may include location information or time information of the electronic device.

In an embodiment, the context information may include health data corresponding to a user account of the electronic device. The health data may be obtained, for example, through the external electronic device (e.g., a smart watch) or the external server.

In an embodiment, the context information may be based on the number of users recognized by the electronic device. For example, the electronic device may recognize user faces using a plurality of cameras facing the same directions as a plurality of display regions. Based on the user face recognition result, the electronic device may determine whether the number of users corresponding to the plurality of display regions is plural.

In an embodiment, the electronic device may omit operation 505 and may directly perform operation 510.

In operation 510, the electronic device may detect a screen layout state of a display. The screen layout state may be based on at least one of a folding angle, a rotation angle, a mounting state, or a gripped state.

In operation 515, the electronic device may determine an application group and a plurality of regions on which execution screens are to be displayed. In an embodiment, the electronic device may determine the application group and the plurality of regions on which the execution screens are to be displayed, based on the detected screen layout state. In the case in which operation 505 is performed, the electronic device may determine the application group and the plurality of regions on which the execution screens are to be displayed, further based on the context information.

In an embodiment, when the electronic device is folded such that the display is divided into a plurality of regions (e.g., the first region 411D and the second region 412D of FIG. 4A) facing different directions, the electronic device may determine the regions facing the different directions as regions on which a plurality of execution screens are to be displayed. In another embodiment, the electronic device may determine activation or deactivation of the plurality of regions depending on a mounting state even at the same folding angle. For example, in the case in which the electronic device 401C or 401D of FIG. 4 further includes the third region (e.g., 162A of FIG. 2) disposed on the opposite surface of the first region 411C or 411D with respect to the housing, when the electronic device is mounted in the state of facing the vertical orientation like the electronic device 401C, the third region may be activated, whereas when the electronic device is mounted in the state of facing the horizontal orientation like the electronic device 401D, the third region does not have to be visible to a user and therefore may be deactivated.

In an embodiment, the electronic device may determine the plurality of regions based on the screen layout state and then may determine the application group based on the number of determined regions. For example, when the display is divided into three regions, the electronic device may determine an application group constituted by three applications. In another example, the number of applications included in the application group may be smaller than the number of divided regions.

In an embodiment, the electronic device may determine a plurality of application groups. In this case, the electronic device may determine the priorities of the application groups based on the user's settings or usage history.

In operations 520 to 550, the electronic device may provide a GUI (e.g., 610A of FIG. 6A) representing an application group list to the user and may receive a user input for executing an application through the GUI. The GUI may represent at least one application group. Additionally, the GUI may represent the detected screen layout state of the electronic device.

In operation 525, the electronic device may display the GUI on a partial region of the display. According to an embodiment, the electronic device may display the GUI in response to reception of a user input for calling the GUI in operation 520. In another embodiment, the electronic device may display the GUI without a user input.

In operation 550, the electronic device may receive a user input for selecting one application group from an application group list included in the GUI. In operation 570, in response to the user input, the electronic device may display a plurality of application execution screens on the plurality of regions.

According to an embodiment, the GUI may provide a function of creating or editing an application group. For example, based on the user input to the GUI, the electronic device may set a PIN group in the application group list (operation 530), may edit a specific application group (operation 535), or may create a new application group (operation 540).

In operation 560, the electronic device may detect a specified application execution event. For example, the electronic device may detect an application execution event corresponding to the screen layout state determined in operation 510. In another example, the electronic device may detect the specified application execution event, further based on at least one of the context information obtained in operation 505 or a condition previously specified by the user, in addition to the screen layout state.

When the application execution event is detected, in operation 570, the electronic device may display a plurality of application execution screens on the plurality of regions, based on the determined application group and the plurality of determined regions even without a user input through the GUI. The application execution event may be based on at least one of the detected screen layout state or the context information. For example, the electronic device 401D of FIG. 4A may detect that the display is partially in-folded, faces the horizontal direction, and is not held by the user (or, is placed on a table). When it is detected that in the detected screen layout state, a stylus pen (not illustrated) is detached from the electronic device 401D or is electrically connected with the electronic device 401D, the electronic device 401D may execute a video application or an image application on the first region 411D even without an additional user input and may execute a drawing application on the second region 412D.

According to an embodiment, the application execution event may be set based on a user input in operation 545. In another embodiment, the application execution event may be determined based on the number of times that a plurality of applications executed in a specific screen layout state are used.

FIGS. 6A to 6D illustrate operations of outputting a plurality of application execution screens depending on a screen layout state according to an embodiment.

Figure 6A:
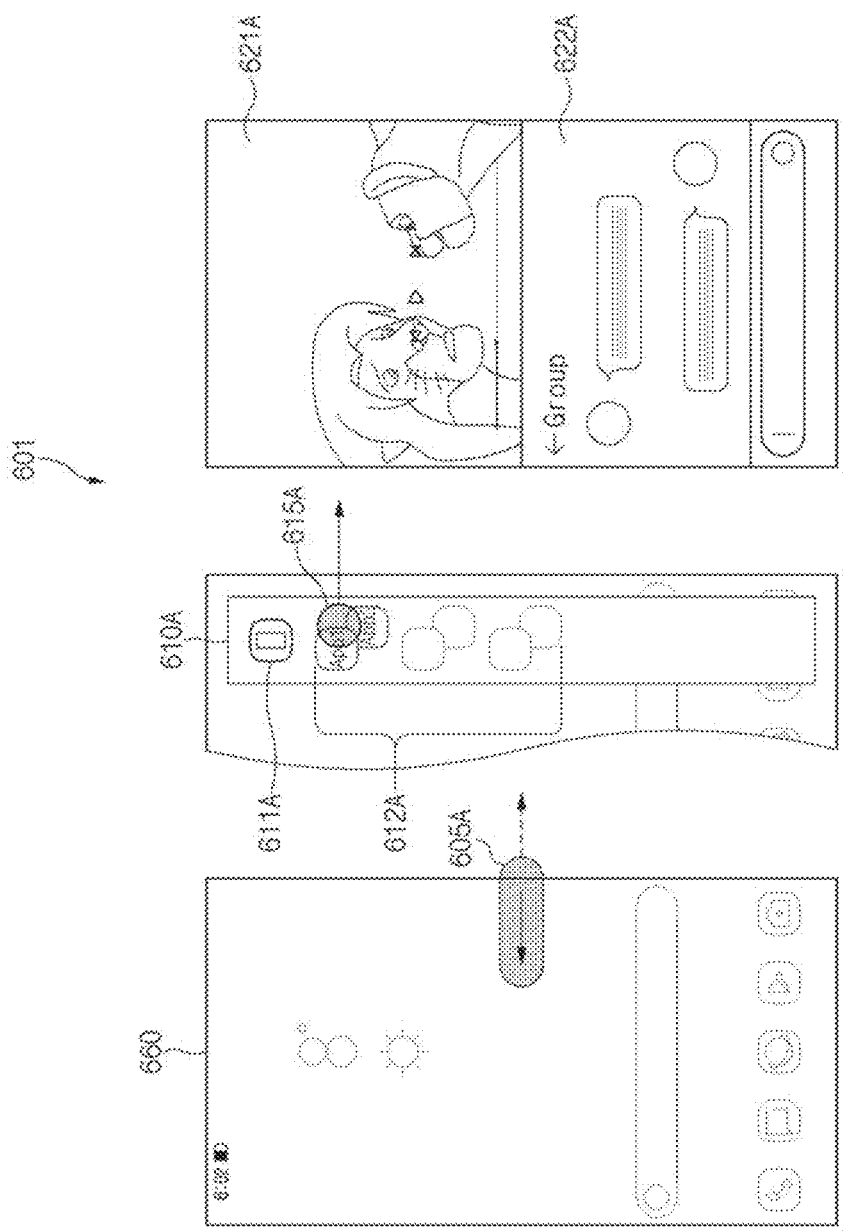
FIG. 6A illustrates an operation of outputting a plurality of application execution screens depending on a screen layout state, according to an embodiment.

Referring to FIG. 6A, as in the electronic device 401B of FIG. 4A, the rotation angle of a display 660 of an electronic device 601 (e.g., the electronic device 101 of FIG. 1) may be the vertical direction, and the display 660 may be in a fully folded state. The electronic device 660 may receive a user input 605A (e.g., a swipe input) that starts from a partial region (e.g., a right or left edge region) of the display 660 (e.g., the display module 160 of FIG. 1).

In response to the user input 605A, the electronic device 601 may display a GUI 610A representing an application group list 612A on a partial region of the display 660. For example, the GUI 610A may appear on the display 660 in the same direction as the swipe input. Additionally, the GUI 610A may include a GUI 611A representing a screen layout state of the display 660. According to an embodiment, the electronic device 601 may display, at the top of the application group list 612A, a first application group (e.g., a video application App1 and a chatting application App2) determined based on the screen layout state of the display 660. The first application group may be determined, further based on at least one of context information, a user's settings, or usage history in addition to the screen layout state.

When a user input 615A (e.g., a touch input) for selecting the first application group is detected, the electronic device 601 may display execution screens of the video application App1 and the chatting application App2 on a plurality of regions 621A and 622A divided based on the screen layout state. According to an embodiment, based on at least one of the types of applications included in the first application group, the user's settings, or usage history, the electronic device 601 may determine the positions of regions on which execution screens of the applications are disposed. For example, since the chatting application App2 requires a keyboard input in real time, the electronic device 601 may display the execution screen of the chatting application App2 on the second region 622A that is a lower end of the display 660.

Figure 6B:
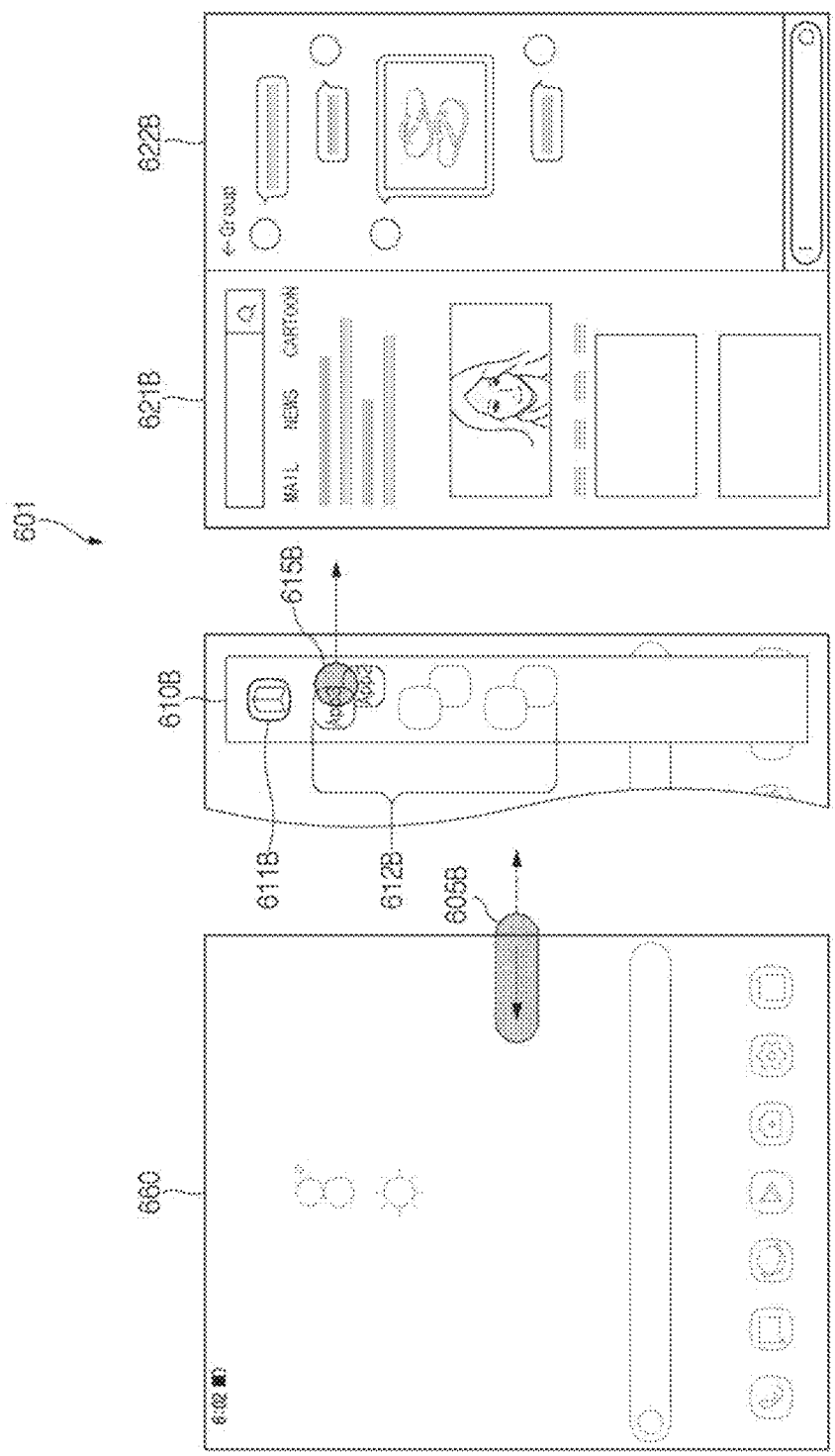
FIG. 6B illustrates an operation of outputting a plurality of application execution screens depending on a screen layout state, according to an embodiment.

Referring to FIG. 6B, as in the electronic device 401C of FIG. 4A, the rotation angle of the display 660 of the electronic device 601 may be the vertical direction, and the display 660 may be in a partially folded state. In response to reception of a user input 605B starting from a partial region of the display 660, the electronic device 601 may display a GUI 610B representing an application group list 612B on a partial region of the display 660. In another embodiment, the electronic device 601 may display the GUI 610B in response to detecting that the electronic device 601 is completely folded (e.g., unfolded) with a specific angle without receiving the user input 605B or in response to reception of the user input 605B after the electronic device 601 is completely folded with the specific angle. Additionally, the GUI 610B may include a GUI 611B representing a screen layout state of the display 660. The electronic device 601 may display, at the top of the application group list 612B, a second application group (e.g., a web browser App3 and a chatting application App2) determined based on the screen layout state of the display 660. The second application group may be determined, further based on at least one of context information, the user's settings, or usage history in addition to the screen layout state. When a user input 615B for selecting the second application group is detected, the electronic device 601 may display execution screens of the web browser App3 and the chatting application App2 on a plurality of regions 621B and 621B divided based on the screen layout state. According to an embodiment, based on at least one of the types of applications included in the second application group, the user's settings, or usage history, the electronic device 601 may determine the positions of regions on which execution screens of the applications are disposed. For example, the electronic device 601 may preferentially display the execution screen of the web browser App3 on the first region 621B located on the left side of the display 660.

Figure 6C:
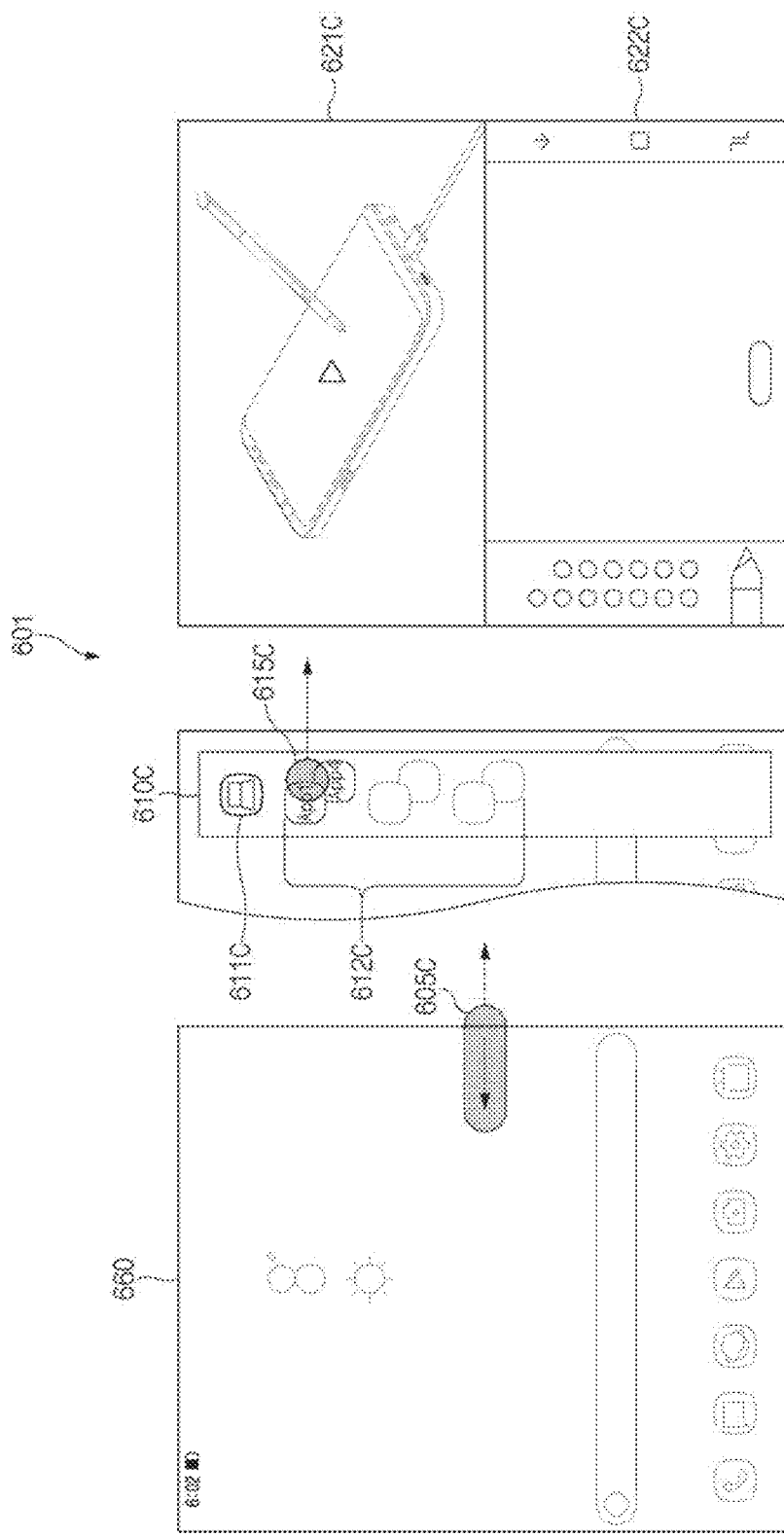
FIG. 6C illustrates an operation of outputting a plurality of application execution screens depending on a screen layout state, according to an embodiment.

Referring to FIG. 6c, as in the electronic device 401D of FIG. 4A, the rotation angle of the display 660 of the electronic device 601 may be the horizontal direction, and the display 660 may be in a partially folded state. In response to reception of a user input 605C starting from a partial region of the display 660, the electronic device 601 may display a GUI 610C representing an application group list 612C on a partial region of the display 660. Additionally, the GUI 610C may include a GUI 611C representing a screen layout state of the display 660. The electronic device 601 may display, at the top of the application group list 612C, a third application group (e.g., a video application App3 and a drawing application App4) determined based on the screen layout state of the display 660. The third application group may be determined, further based on at least one of context information, the user's settings, or usage history in addition to the screen layout state. When a user input 615C for selecting the third application group is detected, the electronic device 601 may display execution screens of the video application App3 and the drawing application App4 on a plurality of regions 621C and 621C divided based on the screen layout state. According to an embodiment, based on at least one of the types of applications included in the third application group, the user's settings, or usage history, the electronic device 601 may determine the positions of regions on which execution screens of the applications are disposed. For example, since the drawing application App4 requires a drawing input in real time, the electronic device 601 may display the execution screen of the drawing application App4 on the second region 622C that is a lower end of the display 660.

Figure 6D:
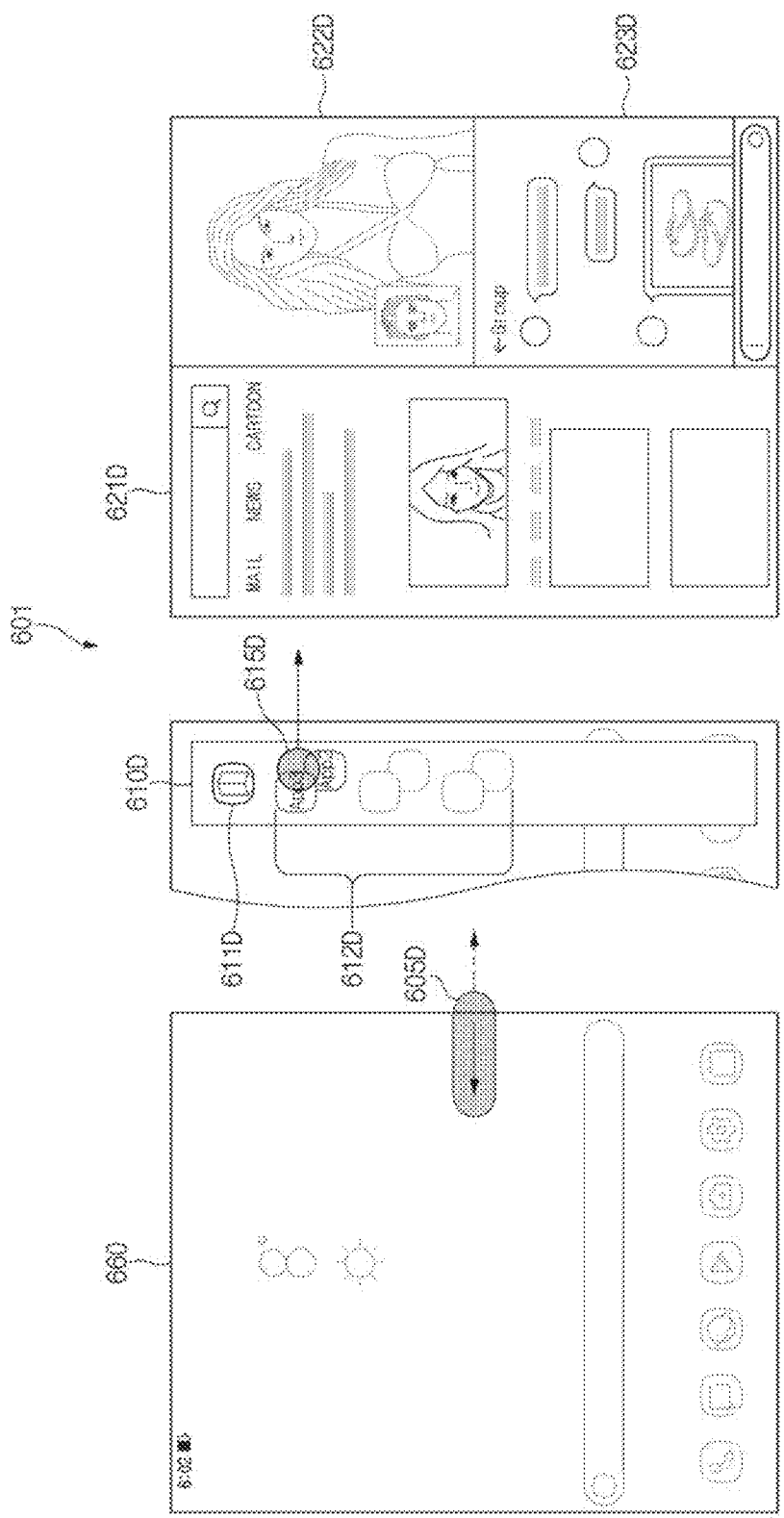
FIG. 6D illustrates an operation of outputting a plurality of application execution screens depending on a screen layout state, according to an embodiment.

Referring to FIG. 6D, as in the electronic device 401A of FIG. 4A, the rotation angle of the display 660 of the electronic device 601 may be the vertical direction, and the display 660 may be in an unfolded state. In response to reception of a user input 605D starting from a partial region of the display 660, the electronic device 601 may display a GUI 610D representing an application group list 612D on a partial region of the display 660. Additionally, the GUI 610D may include a GUI 611D representing a screen layout state of the display 660. The electronic device 601 may display, at the top of the application group list 612D, a fourth application group (e.g., a web browser App3, a video call application App5, and a chatting application App2) determined based on the screen layout state of the display 660. The fourth application group may be determined, further based on at least one of context information, the user's settings, or usage history in addition to the screen layout state. When a user input 615D for selecting the fourth application group is detected, the electronic device 601 may display execution screens of the web browser App3, the video call application App5, and the chatting application App2 on a plurality of regions 621D, 622D, and 623D divided based on the screen layout state. According to an embodiment, based on at least one of the types of applications included in the fourth application group, the user's settings, or usage history, the electronic device 601 may determine the positions of regions on which execution screens of the applications are disposed. For example, the electronic device 601 may preferentially display the web browser App3 on the first region 621D located on the left side of the display and may display the chatting application App2 requiring a keyboard input on the third region 623D that is a lower end of the right region.

FIGS. 6A to 6D illustrate embodiments of receiving the user inputs 605A, 605B, 605C, and 605D for calling the GUIs in the state in which a home screen is displayed. However, according to other embodiments, the electronic device 601 may receive the user inputs 605A, 605B, 605C, and 605D when a lock screen is displayed on the display 660 or the screen of the display 660 is turned off.

Figure 7A:
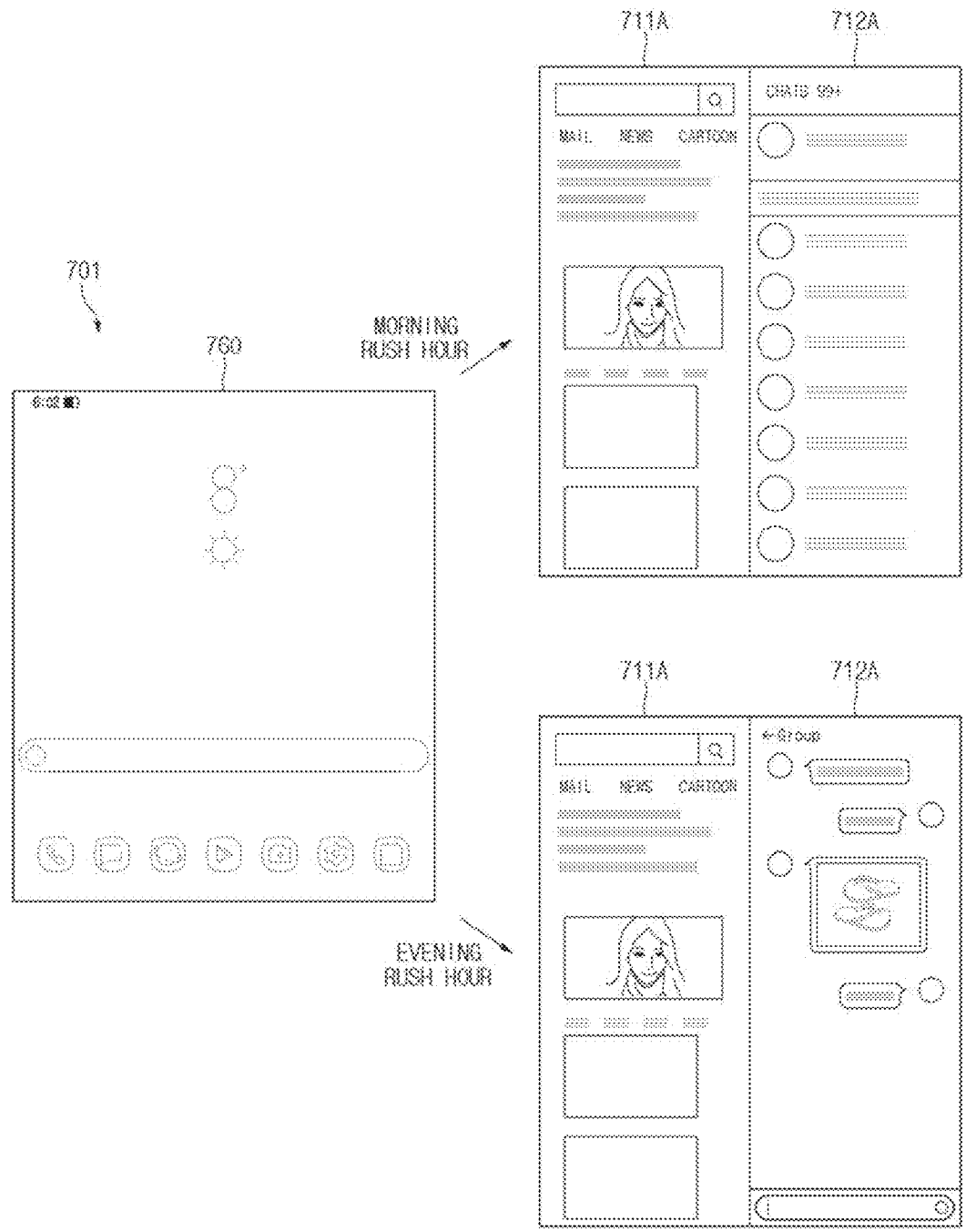
FIG. 7A illustrates an operation of outputting a plurality of application execution screens depending on a screen layout state and context information, according to an embodiment.
Figure 7B:
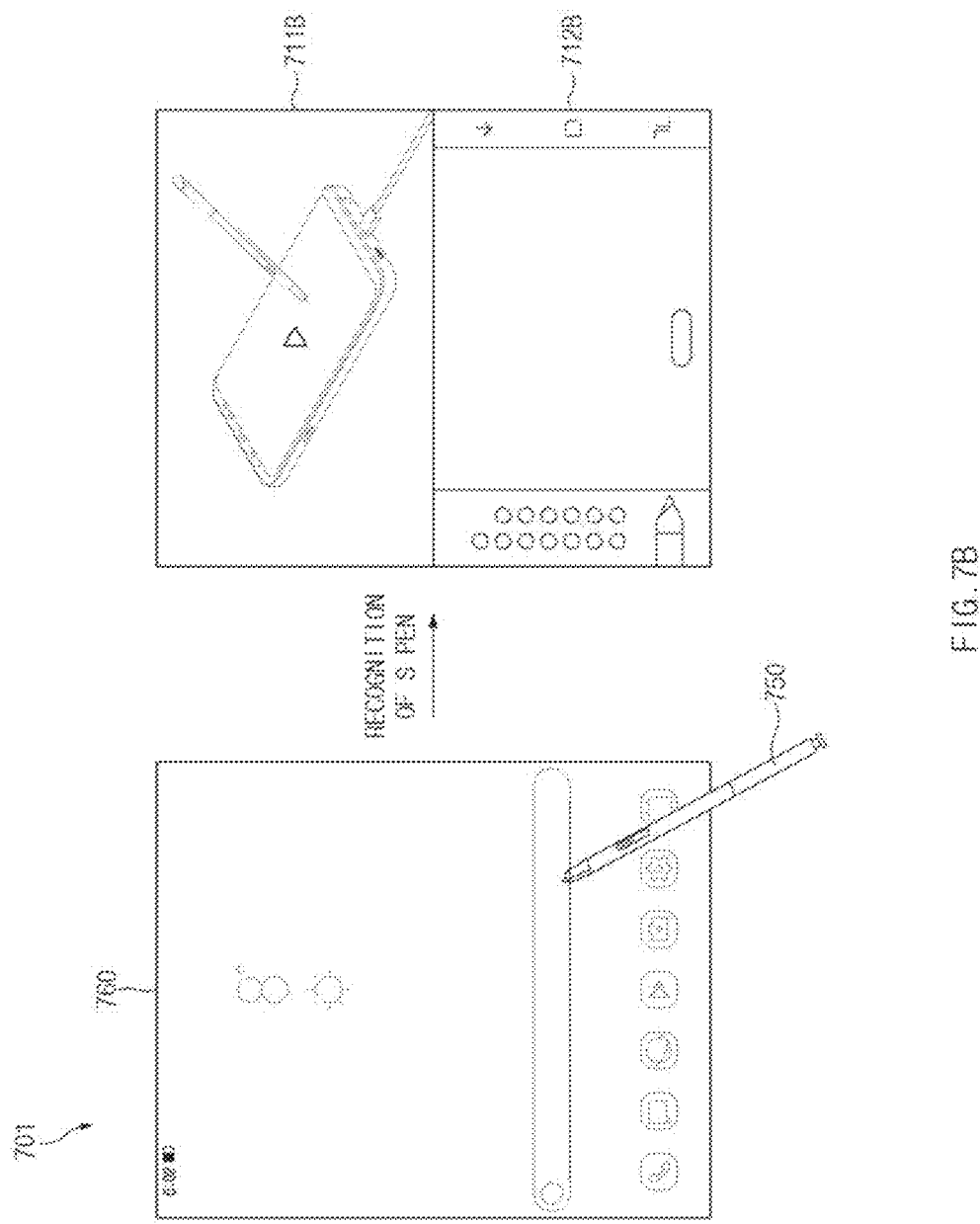
FIG. 7B illustrates an operation of outputting a plurality of application execution screens depending on a screen layout state and context information, according to an embodiment.
Figure 7C:
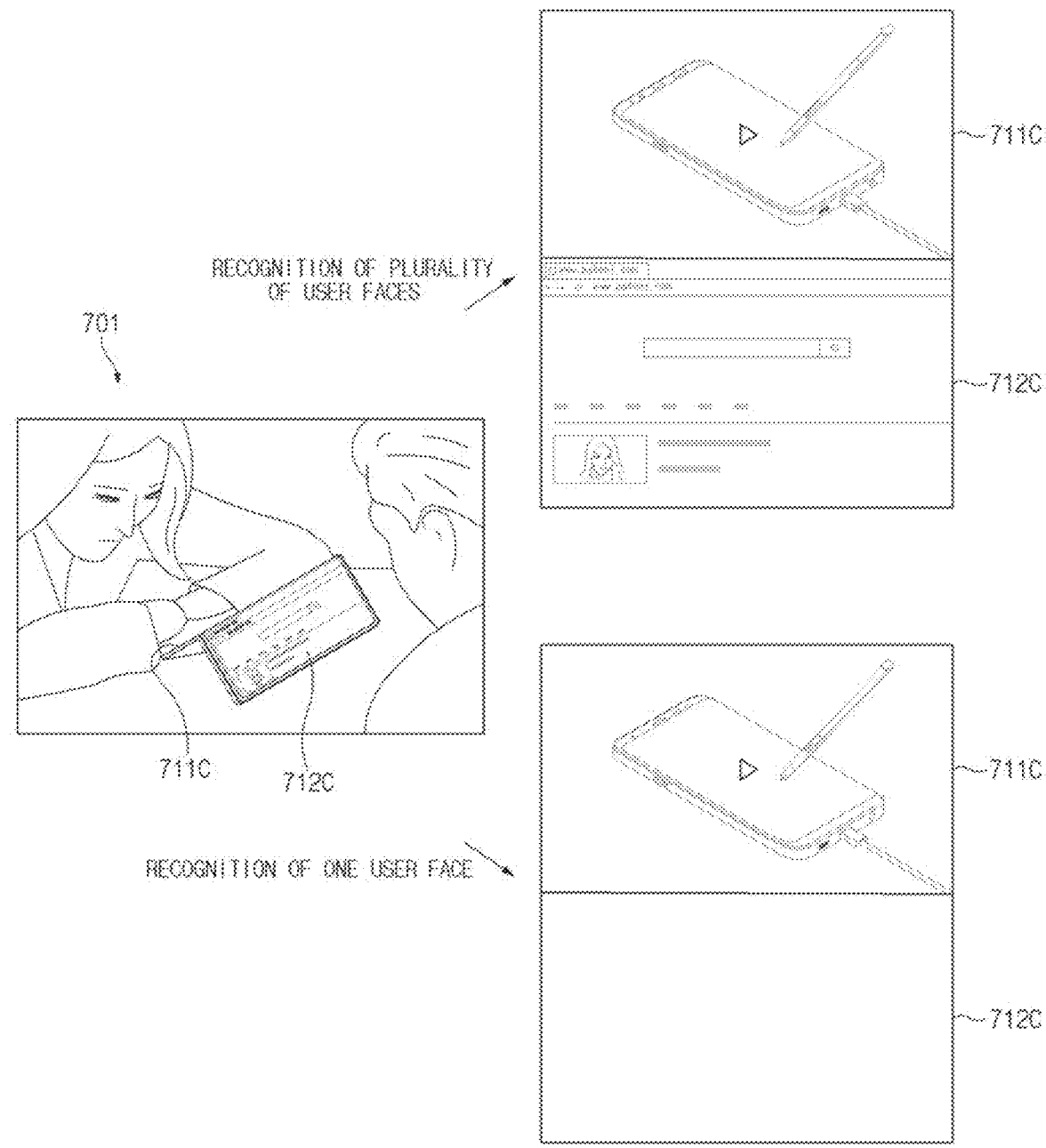
FIG. 7C illustrates an operation of outputting a plurality of application execution screens depending on a screen layout state and context information, according to an embodiment.

FIGS. 7A to 7C illustrate operations of outputting a plurality of application execution screens depending on a screen layout state and context information according to an embodiment.

Referring to FIG. 7A, as in the electronic device 401C of FIG. 4A, the rotation angle of a display 760 (e.g., the display module 160 of FIG. 1) of an electronic device 701 (e.g., the electronic device 101 of FIG. 1) may be the vertical direction, and the display 760 may be in a partially folded state. The electronic device 701 may change an application group displayed on a plurality of regions 711A and 712A, based on at least one of location information or time information of the electronic device 701. For example, when it is detected that the electronic device 701 is located in a position registered as an office or the current time corresponds to office hours (e.g., 9:00 am to 6:00 pm), the electronic device 701 may display an execution screen of a web browser on the first region 711A and may display an execution screen of a work-related application (e.g., an in-house messenger application or a mail application) on the second region 712A. In another example, when it is detected that the electronic device 701 is out of the position registered as the office or the current time does not correspond to the office hours, the electronic device 701 may display, on the second region 712A, an execution screen of another application (e.g., a chatting application) instead of the in-house messenger application.

Referring to FIG. 7B, as in the electronic device 401D of FIG. 4A, the rotation angle of the display 760 may be the horizontal direction, and the display 760 may be in a partially in-folded state. When it is detected that a stylus pen 750 is detached from the electronic device 701 or a connection between the stylus pen 750 and the electronic device 701 is detected, the electronic device 701 may display an execution screen of a video application on a first region 711B and may display an execution screen of a drawing application on a second region 712B. In this case, even if the electronic device 701 does not receive a user input (e.g., 605C of FIG. 6C) for calling a GUI (e.g., 610C of FIG. 6C) and a user input (e.g., 615C of FIG. 6C) for selecting an application group, the electronic device 701 may immediately output execution screens of a plurality of applications based on a detected screen layout state and context information.

Referring to FIG. 7C, the rotation angle of the display 760 of the electronic device 701 may be the horizontal direction, and the display 760 may be in a partially out-folded state. The electronic device 701 may determine a region of the display 760 for output, based on whether a plurality of user faces are recognized in the directions in which a plurality of regions 711C and 712C face. For example, the electronic device 701 may try to recognize the user faces using a first camera (not illustrated) disposed in the same direction as the direction in which the first region 711C faces and a second camera (not illustrated) disposed in the same direction as the direction in which the second region 712C faces. When the user faces are recognized in the directions in which the plurality of regions 711C and 712C face, the electronic device 701 may display a plurality of application execution screens on the plurality of regions 711C and 712C. When a user face is recognized only in one of the directions in which the plurality of regions 711C and 712C face (e.g., the direction corresponding to the first region 711C), the electronic device 701 may display an execution screen of an application on a region (e.g., the first region 711C) corresponding to the direction in which the user face is recognized, and a region (e.g., the second region 712C) corresponding to the direction in which the user face is not recognized may not be activated.

FIGS. 8A to 8C illustrate databases including application groups depending on screen layout states and context information according to an embodiment. A processor (e.g., 120 of FIG. 1) of an electronic device (e.g., 101 of FIG. 1) or an application (e.g., 146 of FIG. 1) executed by the processor may store, in a memory (e.g., 130 of FIG. 1), the databases to be described below and may determine a plurality of application groups based on a detected screen layout state and context information. The databases illustrated in FIGS. 8A and 8C are merely examples.

FIG. 8A illustrates a database for an electronic device that can be folded about one axis as illustrated in FIG. 4A.

Referring to FIG. 8A, the electronic device may detect a first screen layout state 801 (e.g., the electronic device 401D of FIG. 4A). In the first screen layout state 801, the electronic device may operate in a presenter mode in response to detecting that a stylus pen is activated, a mirrored monitor function is activated, and the location of the electronic device corresponds to an office. In this case, the electronic device may display a slide show execution screen of a presentation application (e.g., MS PowerPoint™) on a first region 1 of a display (e.g., the second display 162A of FIG. 2), may display a presenter mode execution screen of the presentation application on a second region 2 of the display, and may display an execution screen of a memo application on a third region 3 of the display. When the mirrored monitor function is not activated under the same conditions as the presenter mode, the electronic device may operate in an interview mode and may display an execution screen of a document viewer application, an execution screen of a movie record application, and an execution screen of a text dictation application on the first region 1, the second region 2, and the third region 3 of the display. When only context information indicating that the electronic device is located in an office is obtained in the first screen layout state 801, the electronic device may operate in a messenger mode and may not activate the first region 1 of the display. The electronic device may display an execution screen of a messenger application and an execution screen of a keyboard application on the second region 2 and the third region 3 of the display.

According to another embodiment, in a second screen layout state 802 (e.g., the electronic device 401C of FIG. 4A), the electronic device may operate in a juke box mode in response to detecting that the location of the electronic device corresponds to a home, a Bluetooth speaker is connected, and the surrounding environment is a dark environment. In this case, the electronic device may display a mood lighting screen of a mood lighting application on the first region 1 of the display (e.g., the second display 162A of FIG. 2), may display a setting screen of the mood lighting application on the second region 2 of the display, and may display an execution screen of a music application on the third region 3 of the display. In another example, the electronic device may operate in a karaoke mode under the same condition as the juke box mode and may display execution screens of other applications (e.g., a karaoke application and an audio recording application) on specific regions (e.g., 2 and 3) of the display. The priorities of the juke box mode and the karaoke mode may be determined based on a user's settings or usage history. When the surrounding environment is not the dark environment under the same condition as the juke box mode, the electronic device may operate in a reading mode. In this case, the electronic device may not activate the first region 1 of the display and may display execution screens of an e-book application and a music application on the second region 2 and the third region 3 of the display.

According to another embodiment, in a third screen layout state 803 (e.g., the electronic device 401D of FIG. 4A), the electronic device may operate in an alarm clock mode in response to detecting that the location of the electronic device corresponds to a home, the user's time to sleep is detected through health data, and a do not disturb (DND) mode is activated. In this case, the electronic device may display an execution screen of an alarm clock application on the first region 1 of the display and may display ambient lighting on the second region 2 of the display. When the end of bedtime is detected in the alarm clock mode, the electronic device may operate in a radio mode and may display execution screens of a radio application and an alarm application on the first region 1 and the second region 2 of the display. In another example, when there is a history in which a reminder application is recently used, the electronic device may operate in a wrap mode and may display, on the first region 1 of the display, a reminder list instead of the execution screen of the radio application.

FIG. 8B illustrates a database for an electronic device that can be folded about a plurality of axes as illustrated in FIG. 4B.

Referring to FIG. 8B, a fourth screen layout state 804 (e.g., the electronic device 401H of FIG. 4B) may perform a function the same as, or similar to, the function of the first screen layout state 801. Accordingly, when the same context information as that in the first screen layout state 801 is obtained, the electronic device may operate in the same mode.

Since a fifth screen layout state 805 has a wider region for receiving a user input than the first screen layout state 801 and the fourth screen layout state 804, the electronic device may display, on a second region 2 of a display, an execution screen of an application requiring a lot of user inputs, such as a drawing application, a piano application, or a keyboard application. For example, the electronic device may operate in a drawing mode when a stylus pen is activated, may operate in an instrument mode when the stylus pen is not activated and a Bluetooth ear set is connected, and may operate in a messenger mode when an external electronic device is not detected.

In a sixth screen layout state 806 (e.g., the electronic device 401G of FIG. 4B), the electronic device may provide different contents to a plurality of users by using different display regions 1 and 2. Accordingly, the electronic device may operate in a duo mode. In the duo mode, the electronic device may provide different application groups to a plurality of users, based on an ongoing application or a recently used application.

FIG. 8C illustrates a database for an electronic device, a display of which can be extended depending on sliding or rolling.

Referring to FIG. 8C, the electronic device may detect a seventh screen layout state 807 or an eighth screen layout state 808, based on at least one of context information obtained in a state in which the display is extended, a user's settings, or usage history. The electronic device may divide the display into a first region 1 and a second region 2 in the seventh screen layout state 807 and may divide the display into a first region 1, a second region 2, and a third region 3 in the eighth screen layout state 808.

In the seventh screen layout state 807, the electronic device may operate in a duo browser mode when a mirrored monitor function is activated, may operate in a study mode when a stylus pen is activated, and may operate in a mail mode when it is detected that the location of the electronic device corresponds to an office.

In the eighth screen layout state 808, the electronic device may detect woke up in the morning. The electronic device may operate in a daily briefing mode, a planner mode, or an ideation mode, based on whether the stylus pen is activated, whether a scheduled task exists, and whether a Bluetooth speaker is connected.

Figure 9:
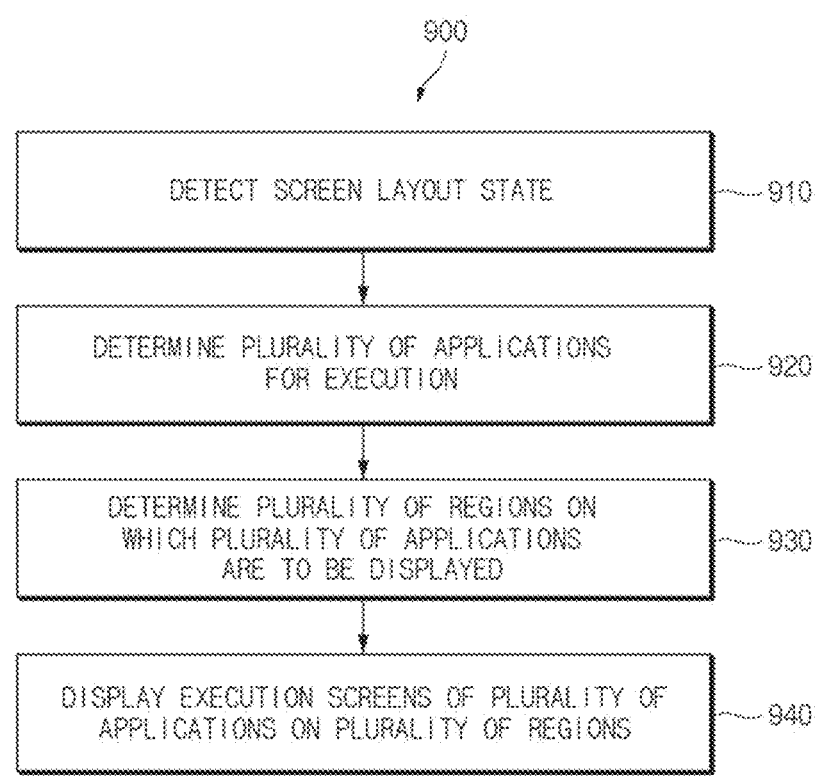
FIG. 9 illustrates an operation flowchart of an electronic device for displaying a plurality of application execution screens, according to an embodiment.

FIG. 9 illustrates an operation flowchart 900 of an electronic device for displaying a plurality of application execution screens according to an embodiment. Operations of the operation flowchart to be described below may be implemented by components included in the electronic device 101 of FIG. 1.

Referring to FIG. 9, in operation 910, the electronic device may detect a screen layout state. The screen layout state may be determined based on at least one of a folding angle, a rotation angle, a gripped state, or sliding or rolling of a display. Although not illustrated in FIG. 9, the electronic device may further obtain context information in addition to the screen layout state.

In operation 920, the electronic device may determine a plurality of applications for execution. The plurality of applications simultaneously executed in the electronic device may be referred to as an "application group". In an embodiment, the electronic device may determine the plurality of applications based on the detected screen layout state. Furthermore, the electronic device may determine the plurality of applications, further based on the context information.

In operation 930, the electronic device may determine a plurality of regions on which the plurality of applications are to be displayed. The plurality of regions may be determined based on the detected screen layout state. According to an embodiment, the electronic device may simultaneously perform operation 920 and operation 930 and may perform operation 930 prior to operation 920.

In operation 940, the electronic device may display execution screens of the plurality of determined applications on the plurality of determined regions. In an embodiment, the electronic device may determine the positions where the execution screens of the plurality of applications are to be displayed among the plurality of regions, based on at least one of the detected screen layout state, the context information, a user's settings, or usage history.

Figure 10:
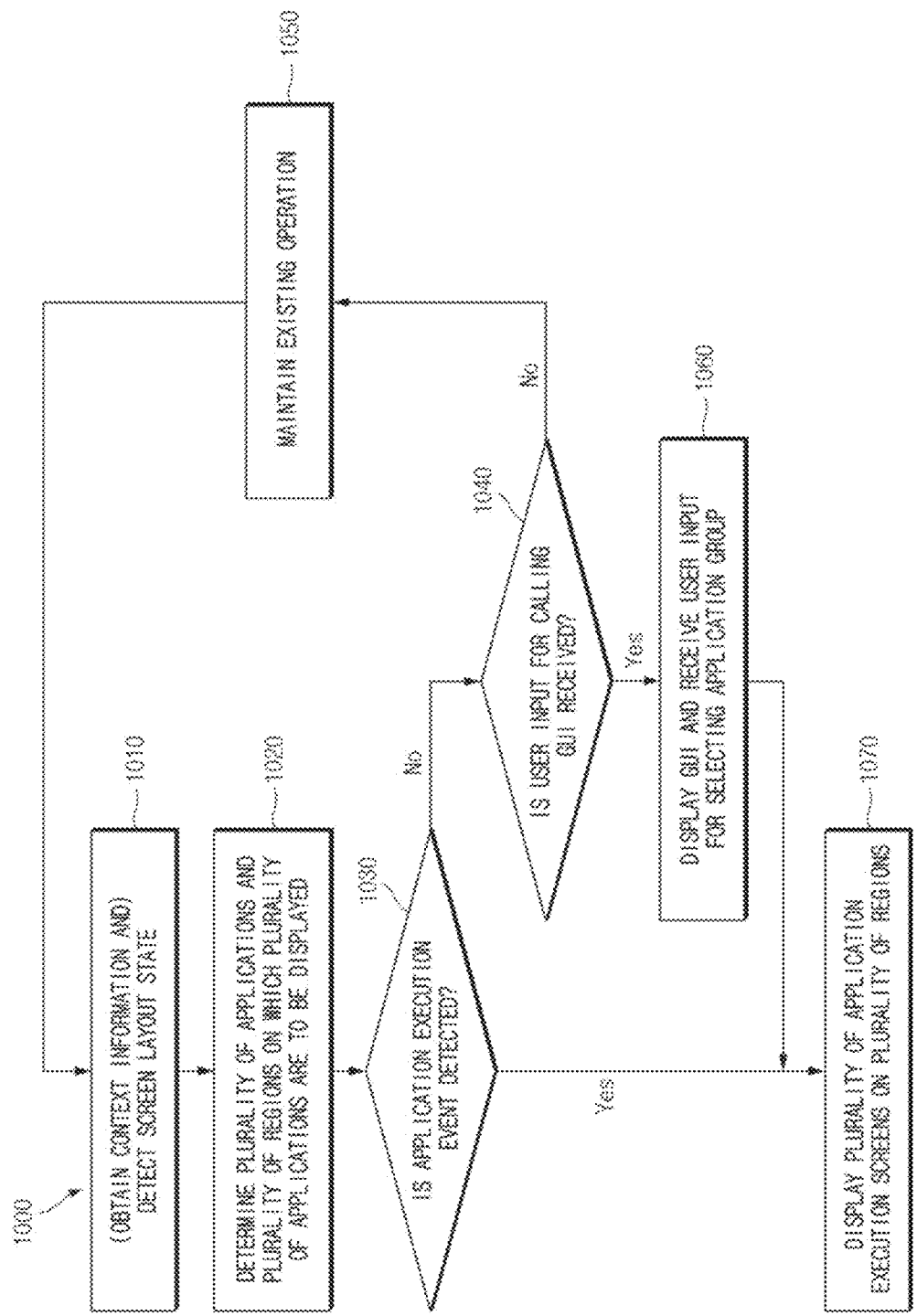
FIG. 10 illustrates an operation flowchart of an electronic device for displaying a plurality of application execution screens, according to an embodiment.

FIG. 10 illustrates an operation flowchart 1000 of an electronic device for displaying a plurality of application execution screens according to an embodiment.

Referring to FIG. 10, operation 1010 and operation 1020 may correspond to operation 910 to operation 930 of FIG. 9.

In operation 1030, the electronic device may determine whether an application execution event is detected (e.g., operation 560 of FIG. 5). The application execution event may be based on at least one of a detected screen layout state, context information, or a user's settings. When the application execution event is detected, in operation 1070, the electronic device may display execution screens of a plurality of applications on a plurality of regions.

When the application execution event is not detected, in operation 1040, the electronic device may determine whether a user input (e.g., 605A of FIG. 6A) for calling a GUI is received. The GUI may represent an application group list. Additionally, the GUI may represent the screen layout state of the electronic device. In addition, the GUI may provide a function of editing or creating an application group. When the user input is not received, in operation 1050, the electronic device may maintain an existing operation and may repeat operation 1010 to operation 1030.

When the user input is received, the electronic device may, in operation 1060, display the GUI and receive a user input (e.g., 615A of FIG. 6A) for selecting an application group through the GUI and thereafter may, in operation 1070, display the execution screens of the plurality of applications on the plurality of regions.

Figure 11:
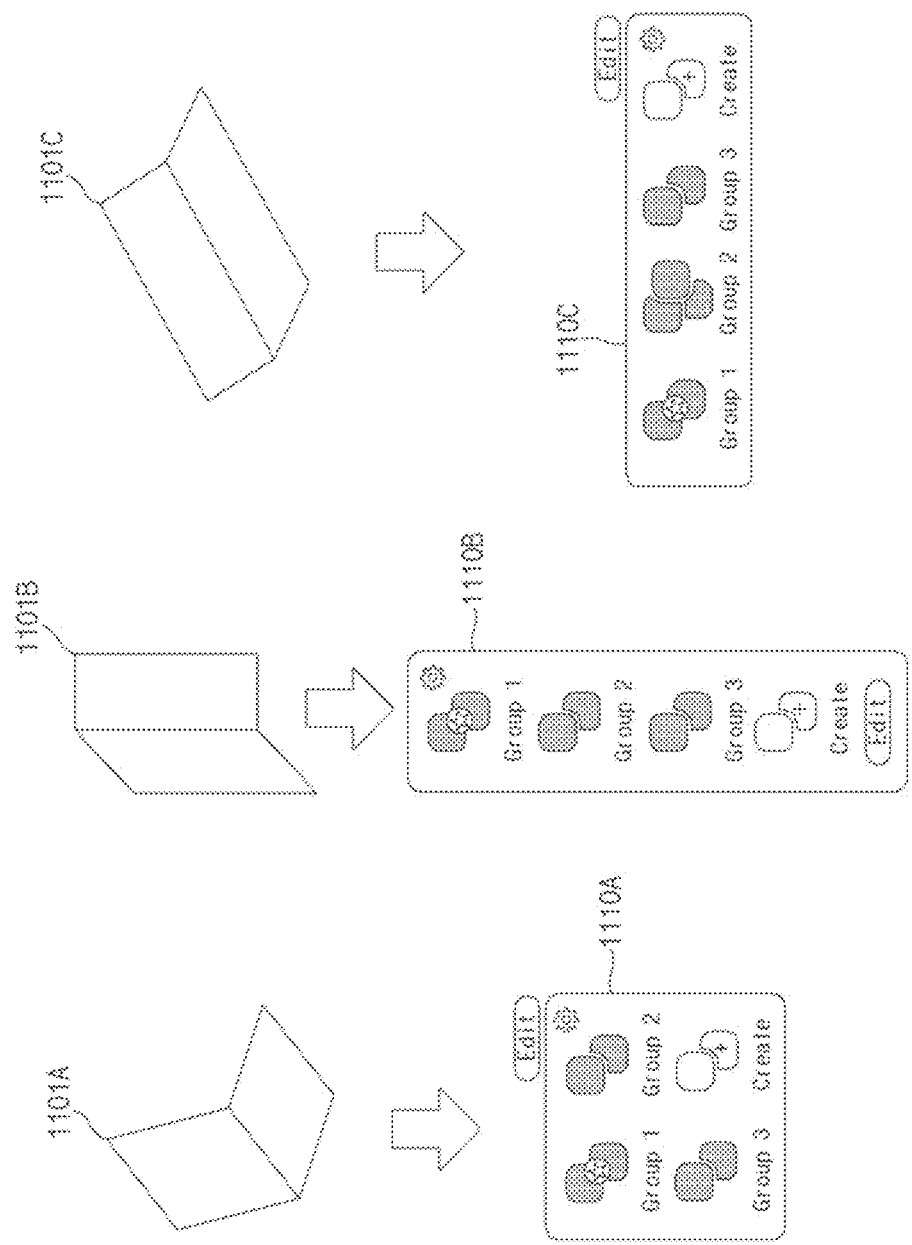
FIG. 11 illustrates a graphic user interface (GUI) representing an application group list, according to an embodiment.

FIG. 11 illustrates a GUI representing an application group list according to an embodiment.

Referring to FIG. 11, the GUI representing the application group list may be differently displayed based on a screen layout state. For example, when a display 1101A of an electronic device has a substantially square shape, the electronic device may provide a GUI 1110A in the form of N X N (N being a natural number). In another example, the electronic device may output a vertical GUI 1110B or a horizontal GUI 1110C in response to detecting that the rotation angle of the display is a vertical direction 1101B or a horizontal direction 1101C.

According to an embodiment, the GUI (e.g., 1110A, 1110B, or 1110C) may provide a list of application groups Group1, Group2, and Group 3, a function for creating or editing the application groups, and a function for setting an application execution event.

Figure 12:
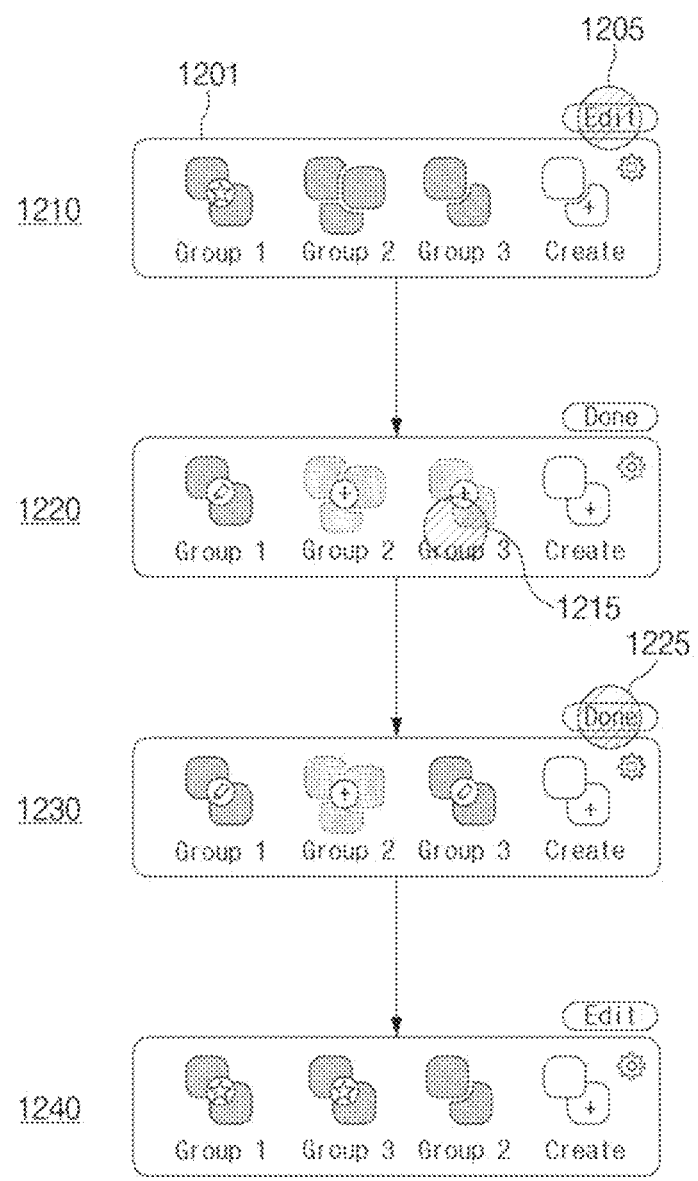
FIG. 12 illustrates an operation of editing a GUI, according to an embodiment.

FIG. 12 illustrates an operation of editing a GUI according to an embodiment.

Referring to FIG. 12, in response to reception of a user input (e.g., 605A of FIG. 6A) for calling a GUI 1201, in operation 1210, an electronic device may display the GUI 1201 on a display. The GUI 1201 may include, on the left side (or, the right side) of the GUI 1201, an application group Group1 set as a PIN. The electronic device (e.g., the electronic device 101 of FIG. 1) may recommend, to a user through the GUI 1201, application groups Group2 and Group 3 determined based on at least one of a screen layout state, context information, or usage history, in addition to the application group Group1 set as the PIN. When a user input 1205 for editing the GUI 1201 is received, in operation 1220, the electronic device may provide an editing screen of the GUI 1021. When a user input 1215 for selecting one (e.g., Group 3) of the recommended application groups is received on the editing screen of the GUI 1021, in operation 1230, the electronic device may display the selected application group Group3. When a user input 1225 for ending the editing of the GUI 1201 is received, in operation 1240, the electronic device may set the selected application group Group3 as a PIN.

Figure 13:
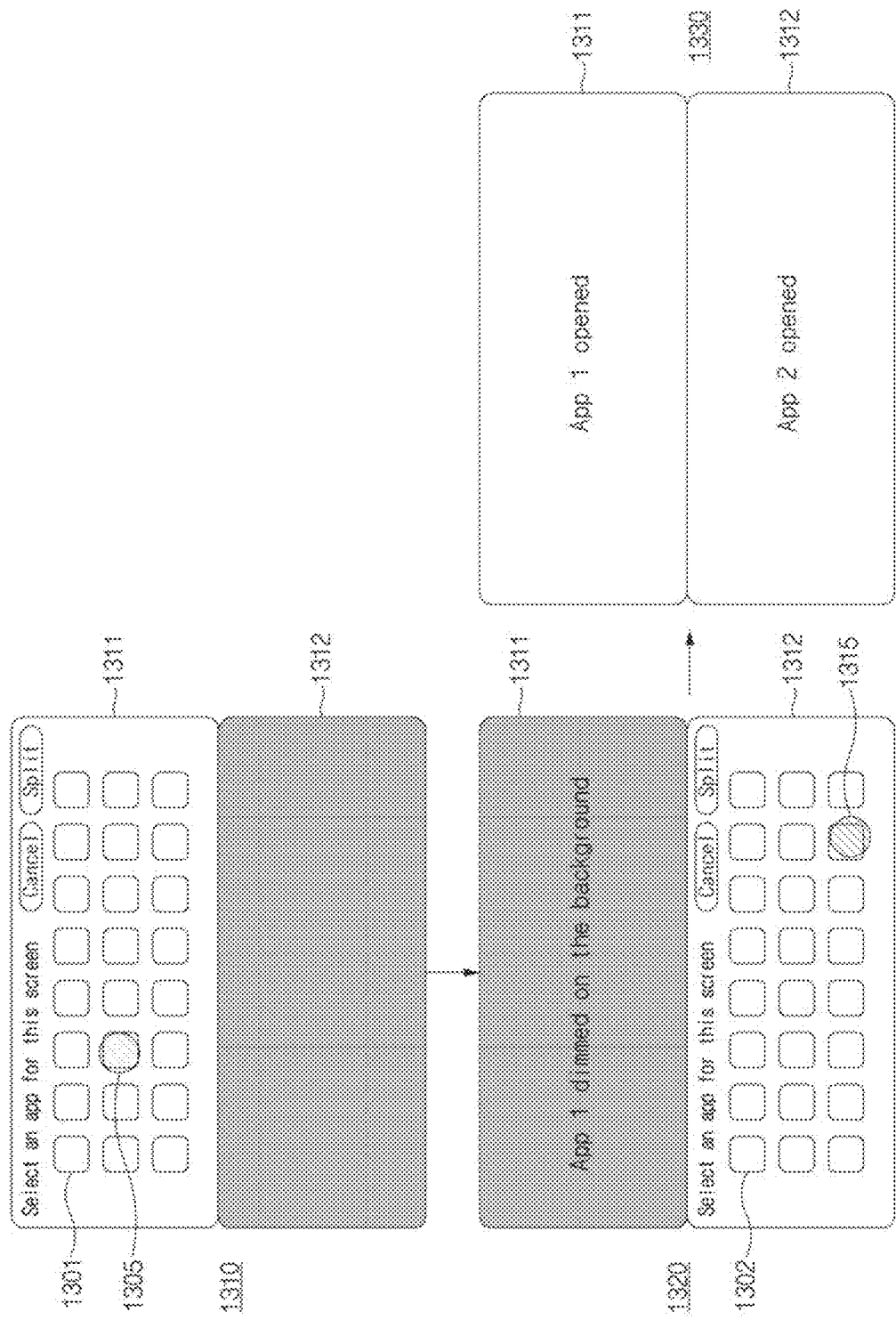
FIG. 13 illustrates an operation of creating an application group, according to an embodiment.

FIG. 13 illustrates an operation of creating an application group according to an embodiment. The operation of FIG. 13 may be performed based on a user input for creating an application group on the GUI 1201 of FIG. 12.

Referring to FIG. 13, in operation 1310, an electronic device (e.g., the electronic device 101 of FIG. 1) may deactivate a second region 1312 while displaying a list of applications (e.g., 1301) to be displayed on a first region 1311 among the regions 1311 and 1312 of a display. Activation may mean, for example, turning on a screen of the display. Deactivation may mean, for example, turning off the screen of the display or applying a dimming effect.

When a user input 1305 for selecting one application App1 from the application list to be displayed on the first region 1311 is detected, in operation 1320, the electronic device may deactivate the first region 1311 and may display a list of applications (e.g., 1302) to be displayed on the second region 1312.

When a user input 1315 for selecting one application App2 from the application list to be displayed on the second region 1312 is detected, in operation 1330, the electronic device may display execution screens of the applications App1 and App2 selected in the respective regions 1311 and 1312 on the regions 1311 and 1312 of the display.

Figure 14:
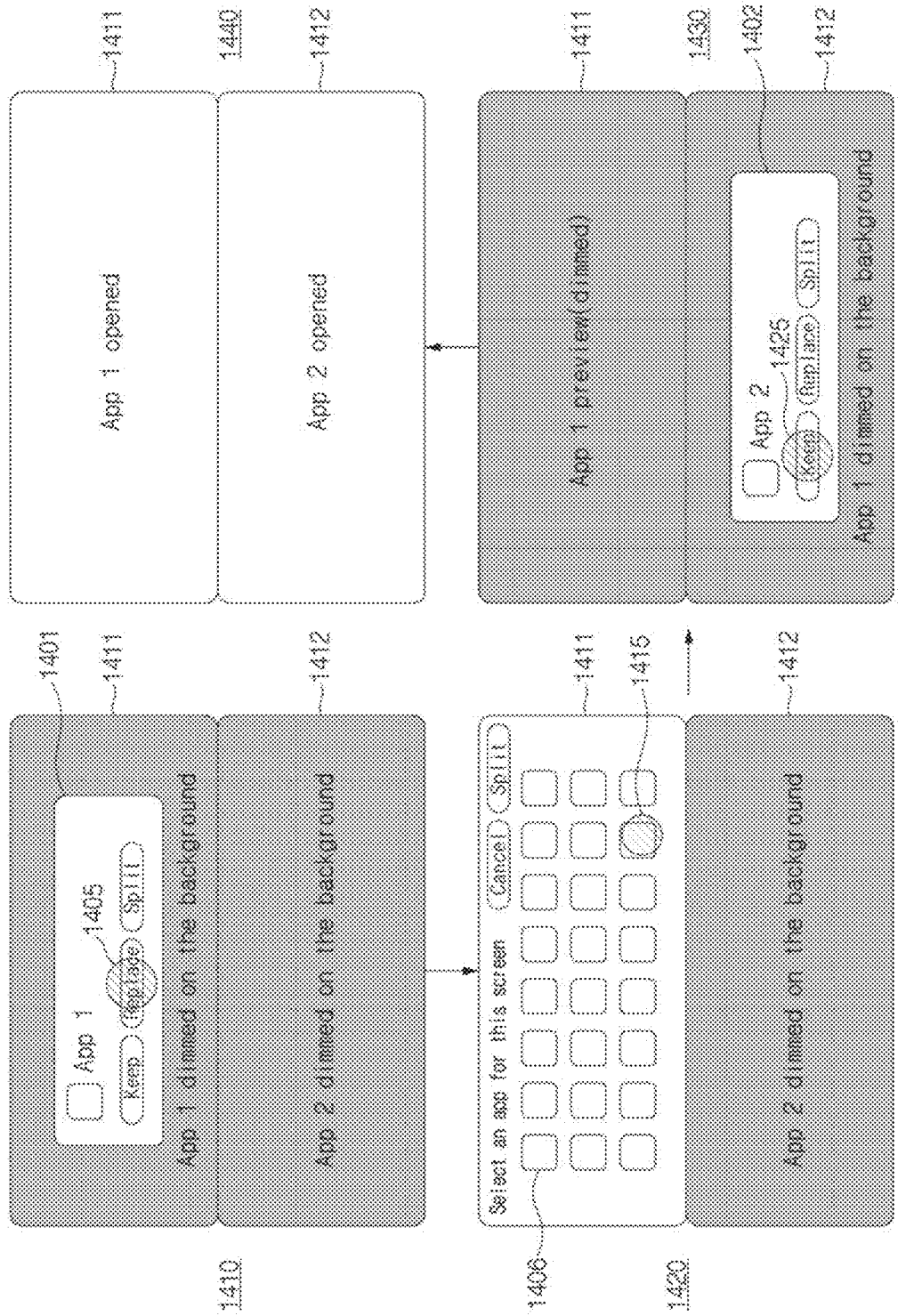
FIG. 14 illustrates an operation of editing an application group, according to an embodiment.

FIG. 14 illustrates an operation of editing an application group according to an embodiment. The operation of FIG. 14 may be performed based on a user input for making a request to edit an application group on the GUI 1201 of FIG. 12 (e.g., an input for selecting the application group Group 1 in operation 1220).

Referring to FIG. 14, in operation 1410, an electronic device (e.g., the electronic device 101 of FIG. 1) may deactivate a first region 1411 and a second region 1412 of a display and may display, on the first region 1411, an editing window 1401 of an application App1 corresponding to the first region 1411.

When a user input 1405 for selecting replacement of an application is detected in the editing window 1401, in operation 1420, the electronic device may display a list of applications (e.g., 1406) to be displayed on the first region 1411 in the same manner as operation 1310 of FIG. 13.

When a user input 1415 for selecting one application to be displayed on the first region 1411 is detected, in operation 1430, the electronic device may deactivate the first region 1411 and the second region 1412 and may display, on the first region 1412, an editing window 1402 of an application App2 corresponding to the second region 1412.

When a user input 1425 for selecting keeping of an application is detected in the editing window 1402, in operation 1440, the electronic device may display execution screens of the edited applications App1 and App2 on the regions 1411 and 1412 of the display.

Figure 15:
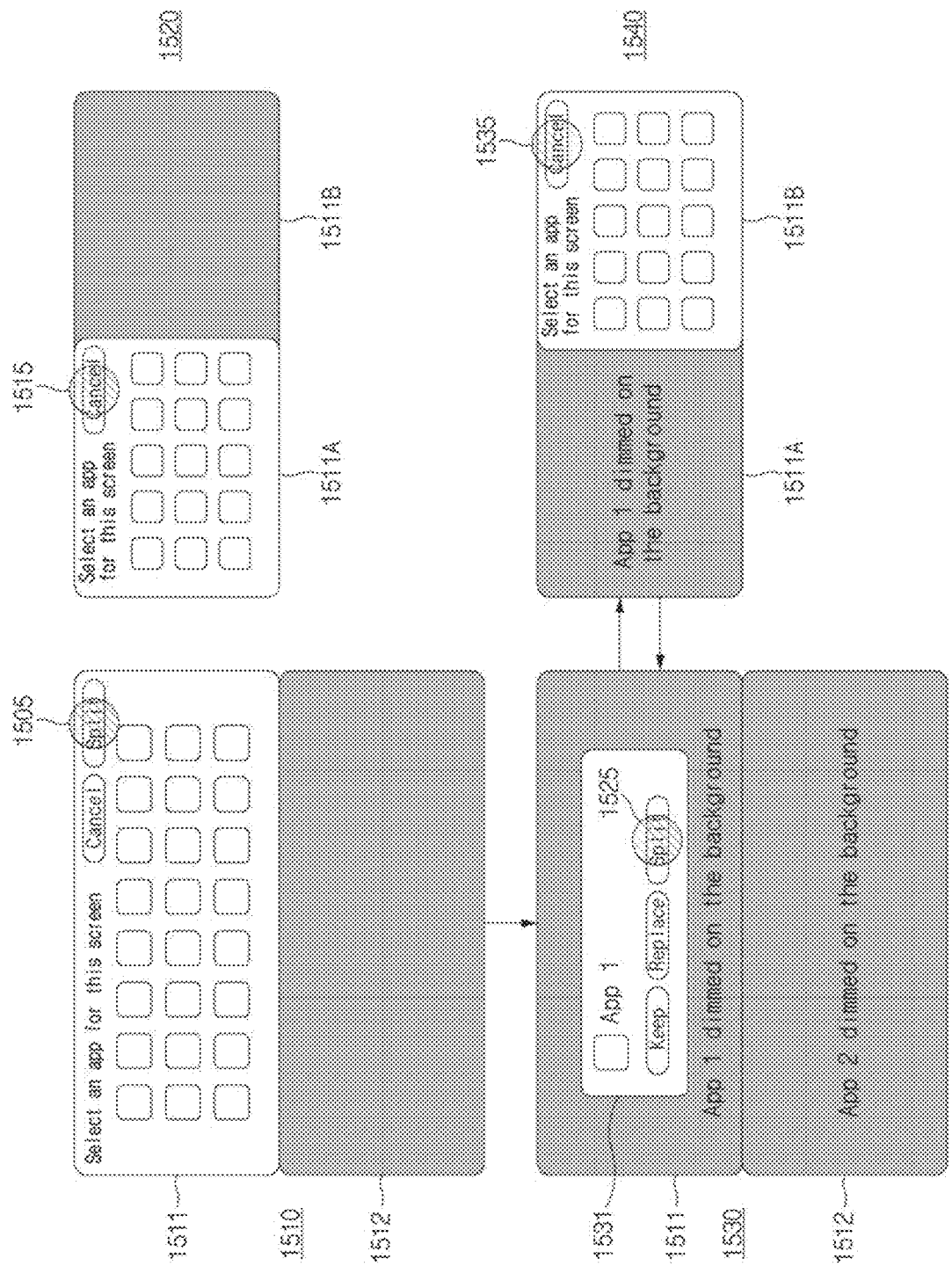
FIG. 15 illustrates an operation of splitting a region of a display, according to an embodiment.

FIG. 15 illustrates an operation of dividing a region of a display according to an embodiment.

Referring to FIG. 15, operations 1510 and 1520 may be performed in an operation of creating an application group as illustrated in FIG. 13. On a screen for selecting an application to be displayed on the first region 1511 (e.g., operation 1310 of FIG. 13), an electronic device may receive a user input 1505 for making a request to divide the first region 1511. In response to the user input 1505, in operation 1520, the electronic device may divide the first region 1511 into a plurality of sub-regions 1511A and 1511B. In this case, to select an application to be displayed on the first sub-region 1511A, the electronic device may activate the first sub-region 1511A and may not activate the second sub-region 1512A. When a user input 1515 for making a request to cancel the division of the first region 1511 is received, the electronic device may display the screen of operation 1510 again.

Operations 1530 and 1540 may be performed in an operation of editing an application group as illustrated in FIG. 14. On a screen for editing an application App1 corresponding to the first region 1511 (e.g., operation 1410 of FIG. 14), the electronic device may receive a user input 1525 for making a request to divide the first region 1511 and may, in operation 1540, divide the first region 1511 into the plurality of sub-regions 1511A and 1511B. When a user input 1535 for making a request to cancel the division of the first region 1511 is received, the electronic device may display the screen of operation 1530 again.

Figure 16:
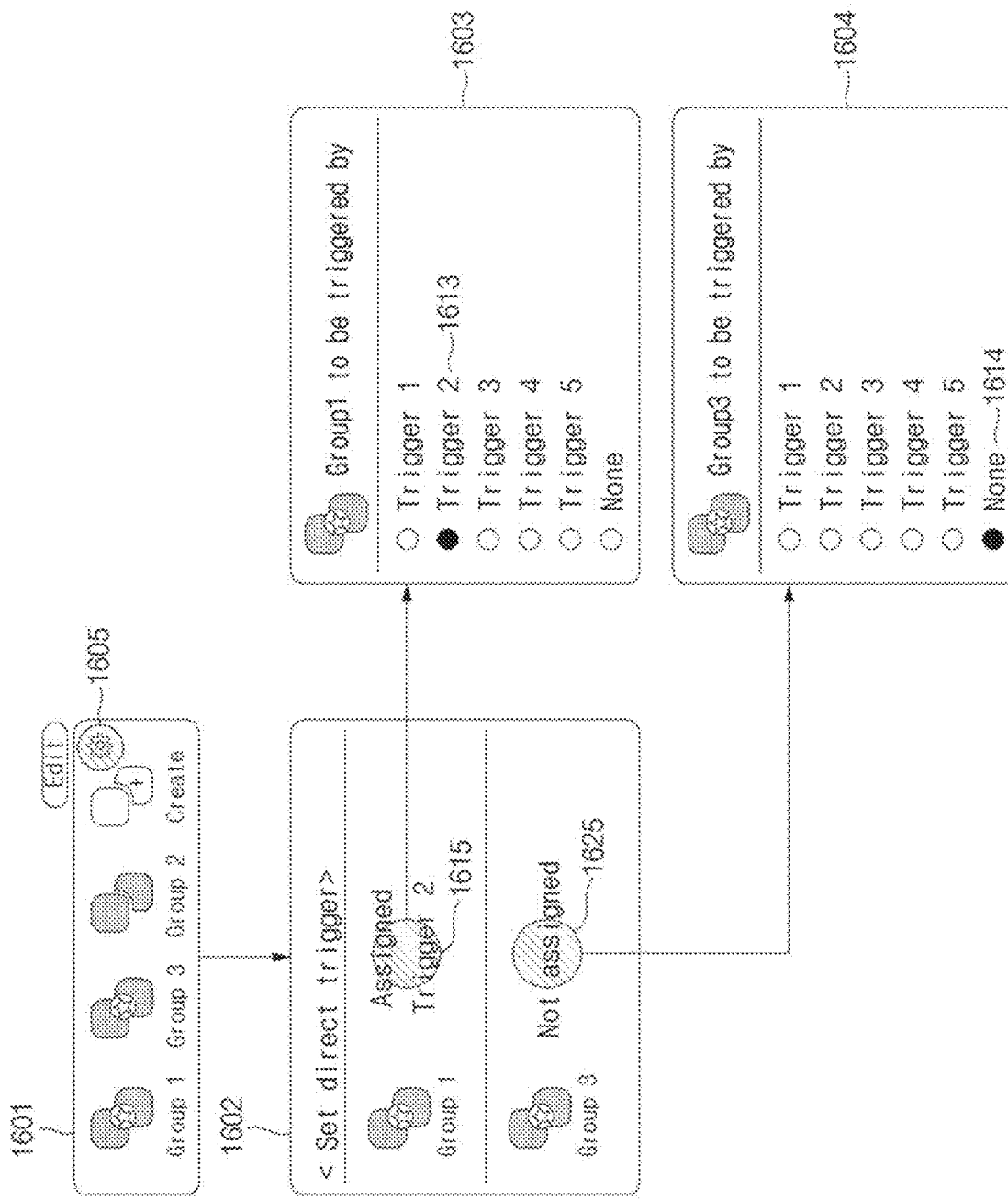
FIG. 16 illustrates an operation of setting an application execution event, according to an embodiment; and With regard to description of the drawings, identical or similar reference numerals may be used to refer to identical or similar components.

FIG. 16 illustrates an operation of setting an application execution event according to an embodiment.

Referring to FIG. 16, in response to a user input 1605 for making a request to set an application execution event on a GUI 1601, an electronic device (e.g., the electronic device 101 of FIG. 1) may display a GUI 1602 for setting the application execution event. The GUI 1602 may represent, for example, application execution events (e.g., Trigger 2, not assigned) of application groups Group1 and Group3 set as favorites. In response to a user input 1615 or 1625 for making a request to set execution events of the application groups Group1 and Group3, the electronic device may display a GUI 1603 or 1604 for setting an application execution event of a selected application group. Depending on the user input, the electronic device may set the application execution event of the application group to a specified condition (e.g., Trigger 2) or may not set the application execution event of the application group (None).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a foldable display;
   a processor operationally coupled with the foldable display; and
   a memory operationally coupled with the processor,
   wherein the memory stores instructions that, when executed, cause the processor to:
      detect a screen layout state of the foldable display based on at least one of a folding angle of the foldable display, a rotation angle of the foldable display, or a gripped state of the electronic device;
      determine a plurality of applications for execution, based on the detected screen layout state;
      obtain context information of the electronic device;
      determine a plurality of regions of the foldable display on which the plurality of applications are to be displayed, based on the detected screen layout state and the obtained context information; and
      display execution screens of the plurality of applications on the plurality of regions,
   wherein the context information comprises at least one of a connection state between the electronic device and an external electronic device, a device type of the external electronic device, external environmental information of the electronic device, location information or time information of the electronic device, or health data corresponding to a user account of the electronic device,
   wherein the electronic device further comprises:
      a first camera disposed to face a direction corresponding to a first region of the foldable display; and
      a second camera disposed to face a direction corresponding to a second region of the foldable display, and
   wherein the stored instructions, when executed, further cause the processor to:
      recognize a plurality of user faces through the first camera and the second camera; and
      determine the plurality of applications for execution based on the recognized plurality of user faces.

2. The electronic device of claim 1, wherein at least one region among the determined plurality of regions of the foldable display is deactivated based on a mounting state of the electronic device, the mounting state being in a state in which the electronic device placed on an object, and
   wherein the mounting state comprises at least one of a first mounting state being in a state in which a fold of the foldable display is in a horizontal direction and a second mounting state being in a state in which the fold of the foldable display is in a vertical direction.

3. The electronic device of claim 1, wherein the instructions, when executed, further cause the processor to:
   determine whether an event related to the display of the execution screens of the plurality of applications is detected, based on the detected screen layout state;
   display the execution screens of the plurality of applications on the plurality of regions based on the event being detected; and
   maintain an existing screen based on the event being not detected.

4. The electronic device of claim 3, wherein the instructions, when executed, further cause the processor to:
   based on receiving a first user input to call a graphical user interface (GUI) representing an application group list and the event being not detected, display the GUI through the foldable display; and
   based on receiving a second user input to select an application group from the application group list, display execution screens of a plurality of applications corresponding to the application group on the plurality of regions.

5. The electronic device of claim 4, wherein the instructions, when executed, further cause the processor to:
   based on receiving a third user input to generate a new application group, display a screen of the first region, among the plurality of regions, and apply dimming to the second region other than the first region, among the plurality of regions;
   based on receiving a fourth user input to select one of a plurality of applications included in the first region, display a screen of the second region and apply dimming to the first region; and
   based on receiving a fifth user input to select one of a plurality of applications included in the second region, display an execution screen of an application selected by the fourth user input on the first region and display an execution screen of an application selected by the fifth user input on the second region.

6. The electronic device of claim 5, wherein the instructions, when executed, further cause the processor to: group the application selected by the fourth user input and the application selected by the fifth user input together as a new application group corresponding to the detected screen layout state.

7. The electronic device of claim 5, wherein the instructions, when executed, further cause the processor to: based on receiving a sixth user input to divide the screen of the first region while the screen of the first region is displayed and dimming is applied to the screen of the second region, divide the first region into a first sub-region and a second sub-region.

8. A method of an electronic device, the method comprising:
  detecting a screen layout state of a foldable display of the electronic device based on at least one of a folding angle of the foldable display, a rotation angle of the foldable display, or a gripped state of the electronic device;
  determining a plurality of applications for execution, based on the detected screen layout state;
  obtaining context information of the electronic device;
  determining a plurality of regions of the foldable display on which the plurality of applications are to be displayed, based on the detected screen layout state and the obtained context information; and
  displaying execution screens of the plurality of applications on the plurality of regions,
  wherein the context information comprises at least one of a connection state between the electronic device and an external electronic device, a device type of the external electronic device, external environmental information of the electronic device, location information or time information of the electronic device, or health data corresponding to a user account of the electronic device, and
  wherein the method further comprises:
  recognizing a plurality of user faces using a plurality of cameras of the electronic device,
  wherein the determining of the plurality of applications for the execution comprises determining the plurality of applications for execution based on the screen layout state and the recognition of the plurality of user faces.

9. The method of claim 8, wherein at least one region among the determined plurality of regions of the foldable display is deactivated based on a mounting state of the electronic device, the mounting state being in a state in which the electronic device placed on an object, and
  wherein the mounting state comprises at least one of a first mounting state being in a state in which a fold of the foldable display is in a horizontal direction and a second mounting state being in a state in which the fold of the foldable display is in a vertical direction.

10. The method of claim 8, further comprising:
  determining whether an event related to the display of the execution screens of the plurality of applications is detected, based on the detected screen layout state,
  wherein the displaying the execution screens of the plurality of applications on the plurality of regions comprises, based on the event being detected, displaying the execution screens of the plurality of applications on the plurality of regions.

11. The method of claim 10, further comprising:
  based on a first user input to call a graphical user interface (GUI) representing an application group list and the event being not detected, displaying the GUI through the foldable display,
  wherein the displaying the execution screens of the plurality of applications on the plurality of regions comprises, based on receiving a second user input to select an application group from the application group list, displaying execution screens of a plurality of applications corresponding to the application group on the plurality of regions.

12. The method of claim 11, further comprising:
  based on receiving a third user input to create a new application group, displaying a screen of a first region among the plurality of regions and applying dimming to a second region other than the first region among the plurality of regions;
  based on receiving a fourth user input to select one of a plurality of applications included in the first region, displaying a screen of the second region and applying dimming to the first region; and
  based on receiving a fifth user input to select one of a plurality of applications included in the second region, displaying an execution screen of an application selected by the fourth user input on the first region and displaying an execution screen of an application selected by the fifth user input on the second region.

13. The method of claim 12, further comprising:
  grouping the application selected by the fourth user input and the application selected by the fifth user input together as a new application group corresponding to the detected screen layout state.

14. The method of claim 12, further comprising:
  based on receiving a sixth user input to divide the screen of the first region while the screen of the first region is displayed and dimming is applied to the screen of the second region, dividing the first region into a first sub-region and a second sub-region.

15. A non-transitory computer readable medium storing one or more instructions executable by a processor of an electronic device, wherein the instructions cause the processor to:
  detect a screen layout state of a foldable display of the electronic device based on at least one of a folding angle of the foldable display, a rotation angle of the foldable display, or a gripped state of the electronic device;
  obtain context information of the electronic device;
  determine a plurality of applications for execution, based on the detected screen layout state;
  determine a plurality of regions of the foldable display on which the plurality of applications are to be displayed, based on the detected screen layout state and the obtained context information; and
  display execution screens of the plurality of applications on the plurality of regions,
  wherein the context information comprises at least one of a connection state between the electronic device and an external electronic device, a device type of the external electronic device, external environmental information of the electronic device, location information or time information of the electronic device, or health data corresponding to a user account of the electronic device, and
  wherein the instructions further cause the processor to:
  recognize a plurality of user faces through a first camera and a second camera; and
  determine the plurality of applications for execution based on the recognized plurality of user faces.

16. The non-transitory computer readable medium of claim 15, wherein the instructions cause the processor to:
  deactivate wherein at least one region among the determined plurality of regions of the foldable display based on a mounting state of the electronic device, the mounting state being in a state in which the electronic device placed on an object, and wherein the mounting state comprises at least one of a first mounting state being in a state in which a fold of the foldable display is in a horizontal direction and a second mounting state being in a state in which the fold of the foldable display is in a vertical direction.

* * * * *